United States Patent
Slurink

(10) Patent No.: US 10,941,007 B2
(45) Date of Patent: Mar. 9, 2021

(54) PICK-AND-PLACE DEVICE

(71) Applicant: Sluis Cigar Machinery B.V., Kampen (NL)

(72) Inventor: Oscar Slurink, Heino (NL)

(73) Assignee: Sluis Cigar Machinery B.V., Kampen (NL)

( * ) Notice: Subject to any disclaimer, the term of this patent is extended or adjusted under 35 U.S.C. 154(b) by 29 days.

(21) Appl. No.: 16/314,222

(22) PCT Filed: Jul. 3, 2017

(86) PCT No.: PCT/NL2017/050440
§ 371 (c)(1),
(2) Date: Dec. 28, 2018

(87) PCT Pub. No.: WO2018/009058
PCT Pub. Date: Jan. 11, 2018

(65) Prior Publication Data
US 2019/0202645 A1    Jul. 4, 2019

(30) Foreign Application Priority Data
Jul. 4, 2016   (NL) .................................... 2017095

(51) Int. Cl.
*B65G 47/91*   (2006.01)
(52) U.S. Cl.
CPC ......... *B65G 47/918* (2013.01); *B65G 47/915* (2013.01)
(58) Field of Classification Search
CPC .. B65G 47/914; B65G 47/915; B65G 47/918; B25J 15/0052; B25J 15/0616
(Continued)

(56) References Cited

U.S. PATENT DOCUMENTS

| 3,495,722 A * | 2/1970 | Schroder ................ A21C 15/00 |
| | | 198/468.3 |
| 6,068,317 A | 5/2000 | Park |
| (Continued) | | |

FOREIGN PATENT DOCUMENTS

EP        2192062 A1    6/2010

OTHER PUBLICATIONS

International Search Report and Written Opinion dated Sep. 29, 2017 for Application No. PCT/NL2017/050440.
(Continued)

*Primary Examiner* — Dean J Kramer
(74) *Attorney, Agent, or Firm* — Patterson + Sheridan, LLP

(57) ABSTRACT

The present invention relates to a pick-and-place device constructed for picking and placing multiple objects simultaneously, the pick-and-place device comprising: a base frame, a coupling device, a support unit which is connected to the base frame via the coupling device, wherein the support unit supports a plurality of arms, wherein the support unit is movable relative to the base frame, wherein the support unit comprises: support unit base, at least one cam track body which is connected to the support unit base, wherein multiple cam tracks are defined in the at least one cam track body, wherein the at least one cam track body is rotatable relative to the support unit base, wherein the coupling device couples the rotation of the at least one cam track body relative to the support unit base to the movement of the support unit relative to the base frame.

20 Claims, 23 Drawing Sheets

(58) Field of Classification Search
USPC .............. 294/65, 87.1; 414/752.1; 198/468.3
See application file for complete search history.

(56) References Cited

U.S. PATENT DOCUMENTS

| | | | | |
|---|---|---|---|---|
| 7,462,148 | B2* | 12/2008 | Knuppel .............. | B65G 47/848 |
| | | | | 414/419 |
| 7,985,065 | B2* | 7/2011 | Lo ....................... | B29C 49/4215 |
| | | | | 198/459.1 |
| 8,033,381 | B2* | 10/2011 | Konstandin ....... | A61F 13/15601 |
| | | | | 198/456 |
| 8,141,922 | B2* | 3/2012 | Shim ................... | H01L 21/6838 |
| | | | | 294/65 |
| 8,439,624 | B2* | 5/2013 | Kageyama .............. | B21D 43/05 |
| | | | | 198/468.6 |
| 8,534,727 | B2* | 9/2013 | Weclawski ........... | B65G 47/918 |
| | | | | 198/468.3 |

OTHER PUBLICATIONS

Search Report dated Mar. 17, 2017 for Application No. NL 2017095.

* cited by examiner

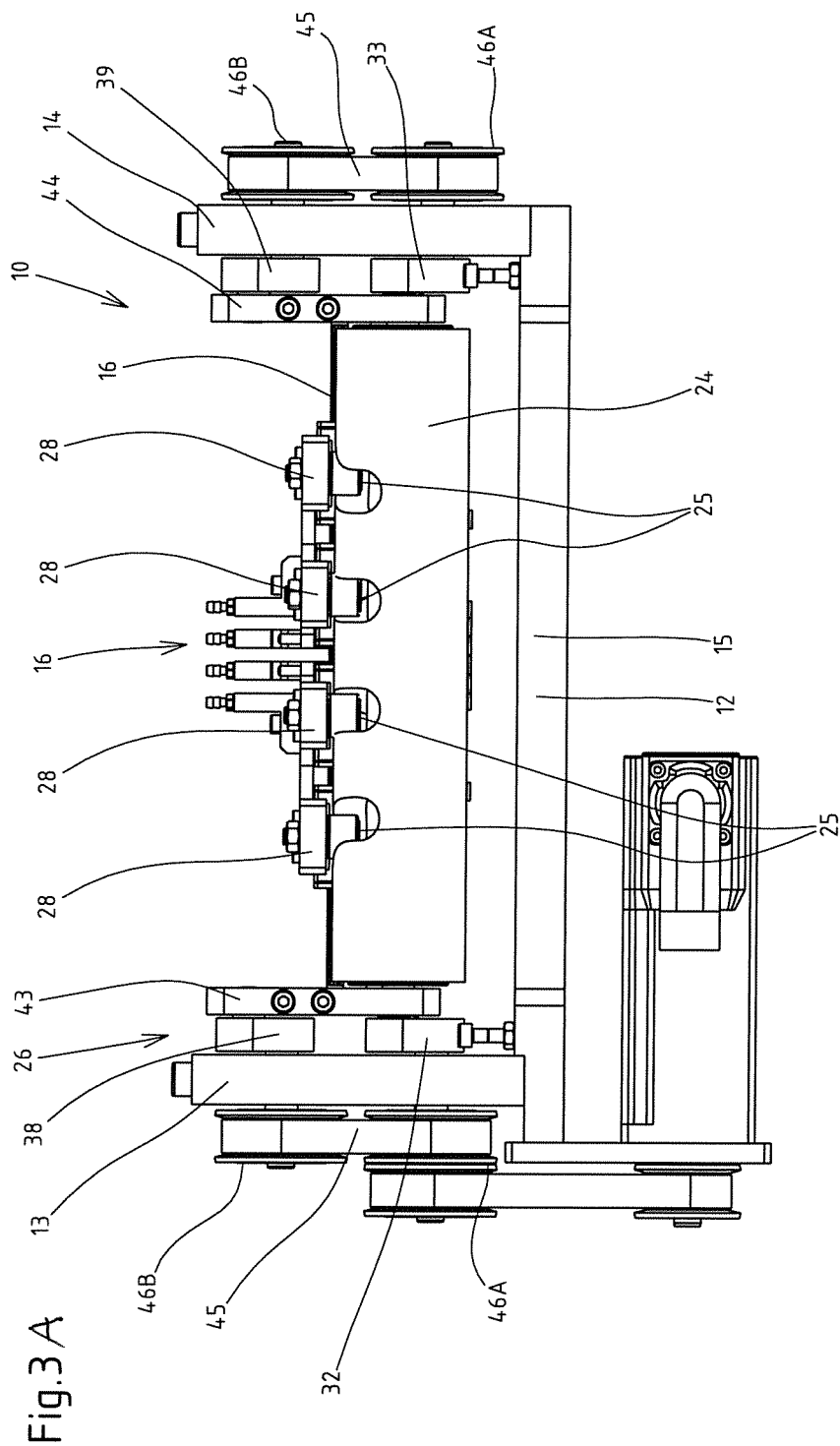

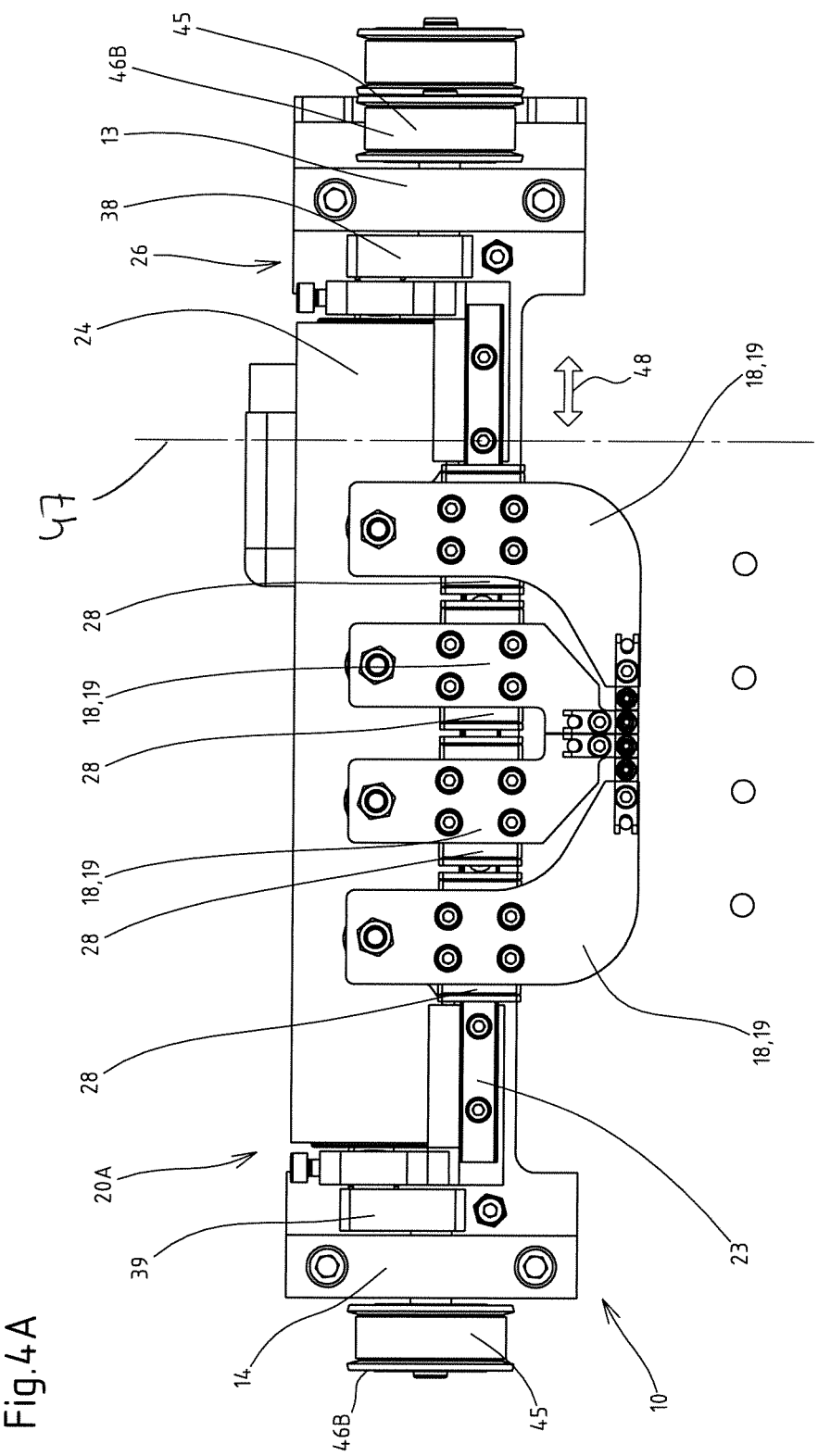

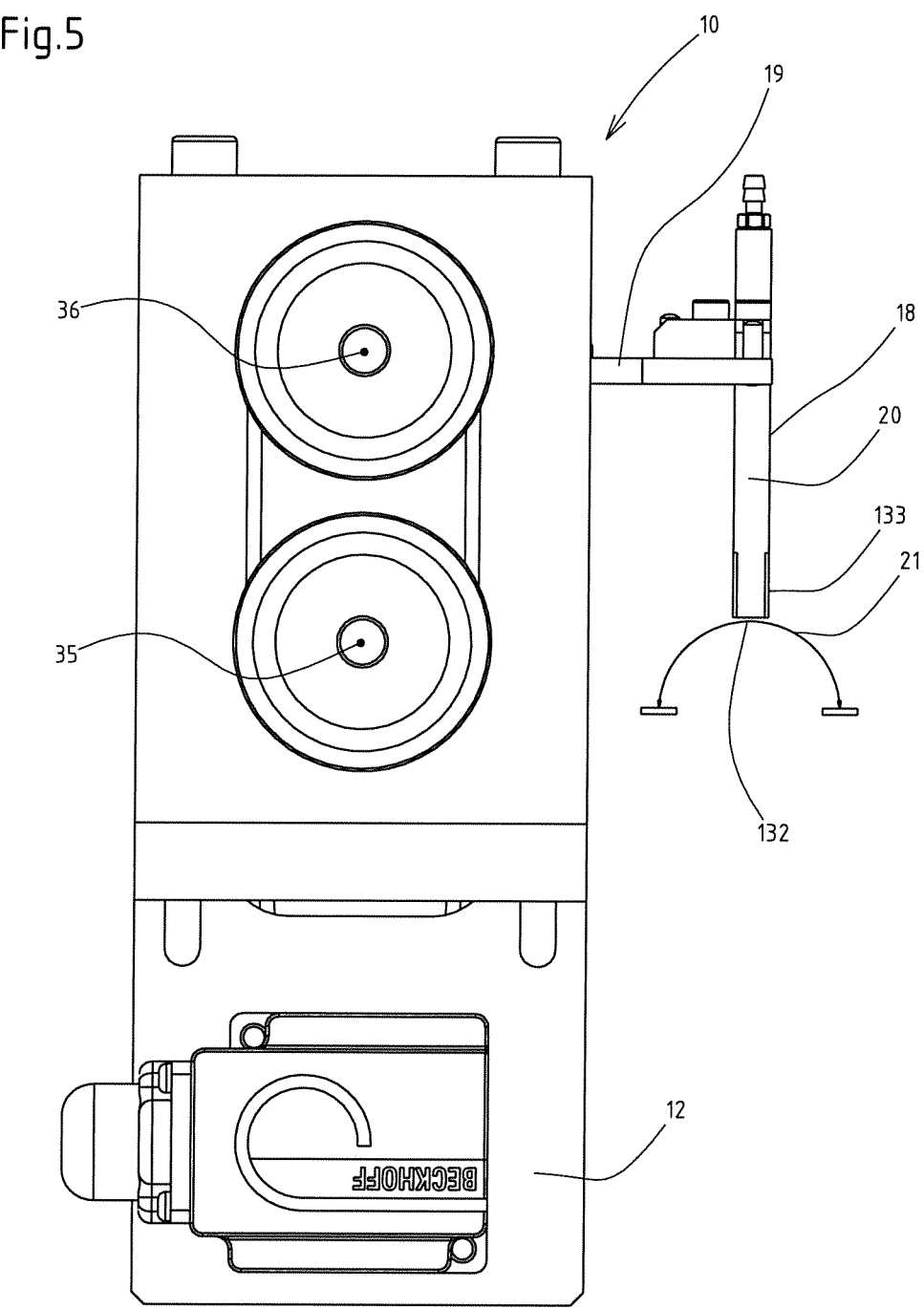

PICK-AND-PLACE DEVICE

FIELD OF THE INVENTION

The present invention relates to a pick-and-place device for picking and placing multiple products simultaneously. The present invention further relates to a method for picking and placing multiple products simultaneously.

BACKGROUND OF THE INVENTION

In an assembly line, products (also referred to as objects) are often conveyed in multiple adjacent rows. This relates in particular to small products. The multiple rows may be straight or curved, when seen in top view.

Often, the products need to be picked up and subsequently placed at another location. The devices which carry out these operations are generally called pick-and-place devices. Many pick-and place devices have been designed in the past, for all kinds of purposes. A general, segmented pick-and-place robot arm is perhaps the most well known example, but many other examples exist for all kinds of applications.

In the field of manufacturing simulated smoking devices and parts thereof, it has been found that the parts are quite small and that a very accurate handling and positioning is required in order to carry out all the processing steps. Moreover, the parts are often conveyed in multiple adjacent rows, and in that situation it is very efficient if in a single pick and place operation a product of each row is picked up. In other words, the pick-and-place device should be able to pick up multiple products (one product from each row) simultaneously and place these products in a different location simultaneously.

Obviously, such an operation could be performed by placing multiple pick-and-place devices along an assembly line. For instance separate robots, each robot having a segmented arm, could be used in synchronization to perform a simultaneous pick and place operation of multiple objects. However, this is not very efficient and may be cumbersome in the actual operation.

Also, for small articles, multiple separate pick-and-place devices could get in the way of one another, because there is relatively little room as a result of the small size of the objects.

Moreover, the reliability of such simultaneous pick-and place operations is mediocre at best. There will be a substantial percentage of products that are not picked up or not placed in the desired location.

It was found that there is a need for a simple and reliable pick-and-place device which can pick up multiple articles simultaneously and place these articles in another location simultaneously. The device should be able to carry out a large number of operations in a reliable manner, and should in particular be configured for handling small products.

OBJECT OF THE INVENTION

It is an object of the invention to provide a simple pick-and-place device which can pick up multiple objects simultaneously and place these articles in another location simultaneously.

It is an object of the invention to provide a pick-and-place device which is capable to carry out a large number of operations in a reliable manner, and is in particular suitable for handling small objects.

SUMMARY OF THE INVENTION

In order to achieve at least one object, the invention provides a pick-and-place device constructed for picking up and placing multiple objects simultaneously, the pick-and-place device comprising:
  a base frame comprising a left post and a right post,
  a coupling device comprising a left eccentric member and a right eccentric member, wherein the left and right eccentric members are pivotable relative to the left and right posts about an eccentric member axis,
  a support unit which is pivotably connected to the left and right post via the left eccentric member and the right eccentric member, wherein the support unit supports a plurality of arms, wherein the support unit is movable relative to the base frame, wherein the support unit comprises:
    a support unit base,
    at least one cam track body which is connected to the support unit base, wherein multiple cam tracks are defined in the at least one cam track body, wherein the at least one cam track body is fixed to said left and right eccentric member, wherein the at least one cam track body is rotatable relative to the support unit base, wherein the at least one cam track body is pivotable about the eccentric member axis, and wherein a cam track axis is offset over a distance from the eccentric member axis,
  wherein the coupling device couples the rotation of the at least one cam track body relative to the support unit base to the movement of the support unit relative to the base frame,
  multiple movable arms connected to and supported by the support unit, wherein each movable arm comprises:
    a cam configured to move in a rotatable cam track which is associated with said movable arm,
    a pickup member connected to a free end of each arm, the pickup member being configured to pick up an object and to move said object from a first location to a second location,
  wherein each moveable arm including the pickup member is movable between a first arm position and a second arm position, and wherein the movements of the respective pickup members are composed of:
    the movement of the support unit relative to the base frame, and
    the movement of the respective arms relative to the support unit.

With the device according to the invention a very reliable and simple pick and place operation of multiple objects is possible.

In an embodiment, the pickup members are movable from respective first positions to respective second positions over respective curved paths, wherein said curved paths are movements composed of two separate movements:
  a circular or composite movement of the support unit relative to the base frame, and
  a rotary or linear movement of the arms relative to the support unit.

It was found that with the combination of these separate movements, the required total movement is effectively possible.

In an embodiment:
  the support unit comprises a traveller track mounted to the support unit base,
  each movable arm comprises a traveller configured for travelling along said traveller track between a first traveller position and a second traveller position, wherein each arm is supported by the support unit via the traveller.

The traveller track was found to provide a very reliable and accurate movement of the arms.

In an embodiment, the posts define:
the eccentric member axis, and
a second eccentric member axis which is parallel to the eccentric member axis,
wherein the coupling device further comprises a second right eccentric member which is positioned at a distance from (in particular above) the right eccentric member and a second left eccentric member which is positioned at a distance (in particular above) from the left eccentric member, wherein the second right eccentric member and the second left eccentric member are pivotable relative to the right and left post about the second eccentric member axis, and wherein the support unit is pivotably connected to the left post via both the second left eccentric member and the left eccentric member and to the right post via both the second right eccentric member and the right eccentric member, wherein the four eccentric members define the trajectory of the support unit relative to the base frame and the rotation of the at least one cam track body relative to the support unit.

In an embodiment, the coupling device comprises a rotation coupling member which couples the second left eccentric member to the left eccentric member and/or couples the second right eccentric member to the right eccentric member in order to keep the second left and right eccentric members in a same rotational position as the left and right eccentric members during the movement of the support unit along the support unit trajectory.

In an embodiment, the support unit trajectory is aligned with a first plane, and wherein the movement of the arms are aligned with a second plane which is orthogonal to the first plane.

In an embodiment, the traveller track is straight and defines a linear movement of the arms between the respective first traveller positions and the second traveller positions, wherein said traveller track is oriented at right angles to said first plane, wherein the direction of movement of the arms is also oriented at right angles to the first plane.

In an embodiment, the eccentric member axis and the cam track axis are parallel to the traveller track.

In an embodiment, the traveller track, the cam track rotation axis, the eccentric member axis and the second eccentric member axis extend horizontally.

In an embodiment, the support unit trajectory is curved, more in particular circular.

In an embodiment, the at least one cam track body is located in a lower region of the support unit, and the movable arms are located above the at least one cam track body.

In an embodiment, said at least one cam track body is a cylinder, the cam tracks being grooves in said cylinder.

In an embodiment, the eccentric member axis is vertically below the second eccentric member axis.

In an embodiment, the cam tracks are diverging and wherein during the movement of the arms from the respective first traveller positions to the second traveller positions the arms move away from one another, increasing a distance between the pickup members, wherein in the second traveller positions the pickup members are positioned further from the first and second axis than in the first traveller positions.

In an embodiment, the pick-and-place device comprises a single drive and a transmission mechanism wherein the single drive is constructed:
to move the support unit between the first support position and the second support position, and
to pivot the at least one cam track body about the eccentric member axis during said movement.

In an embodiment, the single drive is coupled to all four eccentric members via the transmission mechanism and the single drive pivots all four eccentric members between a first and second angular position.

In an embodiment, each movable arm is configured to move in a direction parallel to the traveller track.

In an embodiment, the pick-and-place device comprises a suction device, the suction device comprising a suction pump and conduits extending from the suction pump to suction nozzles of the pickup members and a control system for controlling the suction at the suction nozzles.

In an embodiment, the cam track body is rotatably connected to the left and right post and has only a single degree of freedom of movement relative to the left and right post, the single degree of freedom being the rotation about the eccentric member axis.

In an embodiment, the second eccentric member axis is horizontally offset over a distance from the eccentric member axis.

In an embodiment, the pick-and-place device comprises a right linear bearing connected to the right post and a left linear bearing connected to the left post, wherein coupling device comprises a right rod and a left rod extending from the support unit and being connected in a sliding manner to respectively the left linear bearing and the right linear bearing.

In an embodiment, each arm is connected to the support unit base via a pivotable coupling.

The present invention further relates to a method of picking and placing, the method comprising:
picking a plurality of objects at respective first object positions
moving the support unit from the first support position to the second support position, wherein during said movement the at least one rotatable cam track body rotates relative to the support unit, and wherein each moveable arm moves from the first arm position to the second arm position as a result of the interaction between the cam and the cam track, and
placing the objects at respective second object positions.

The method has the same advantages as the pick-and-place device according to the invention.

These and other aspects of the invention will be more readily appreciated as the same becomes better understood by reference to the following detailed description and considered in connection with the accompanying drawings in which like reference symbols designate like parts.

BRIEF DESCRIPTION OF THE FIGURES

FIG. 3A shows a rear view of the first embodiment of the invention.

FIG. 4A shows a top view of the first embodiment of the invention in a first position.

FIG. 5 shows a side view of the first embodiment of the invention.

DETAILED DESCRIPTION OF THE FIGURES

Figure 1A:
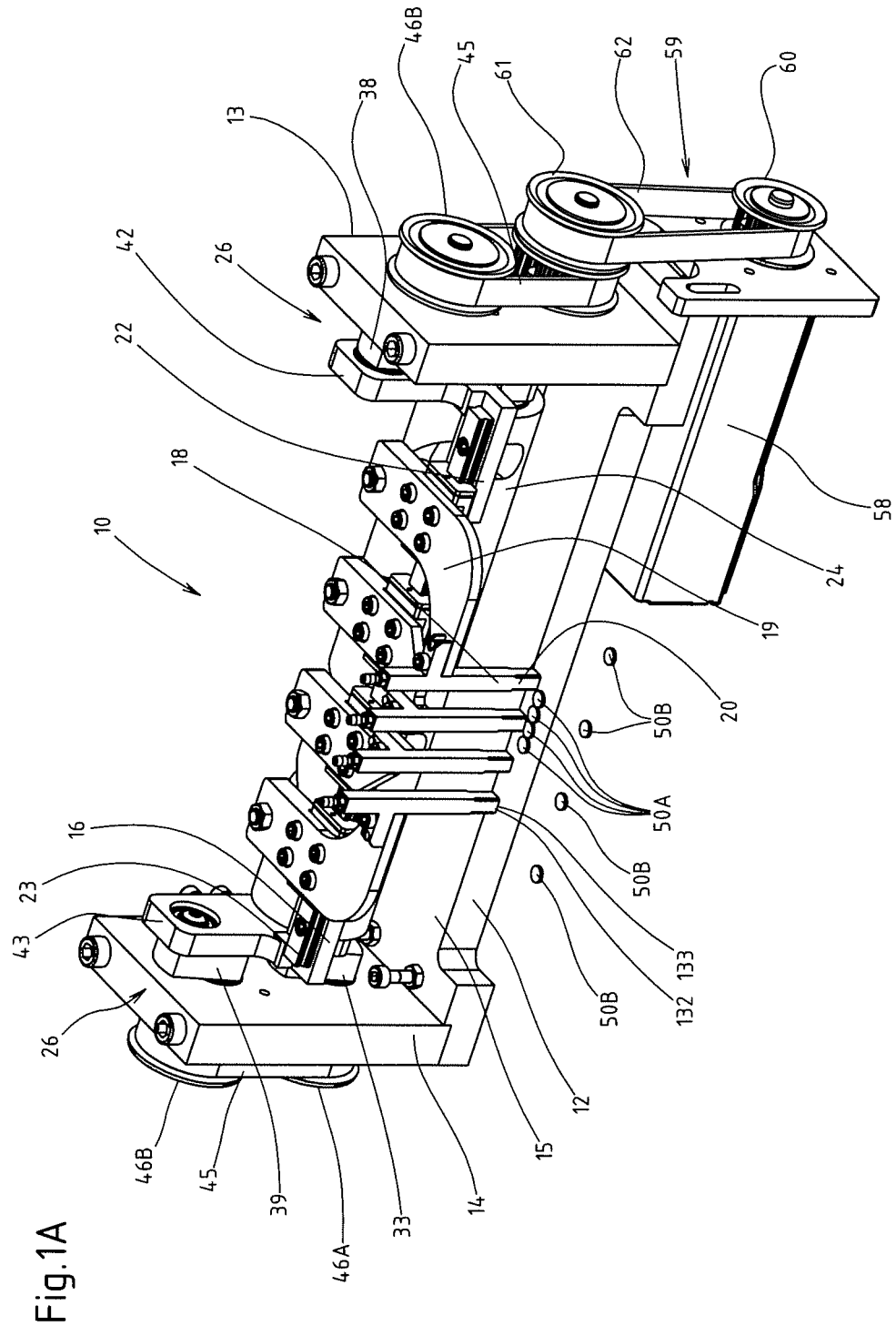
FIGS. 1A and 1B shows isometric views of a first embodiment of the invention.
Figure 1B:
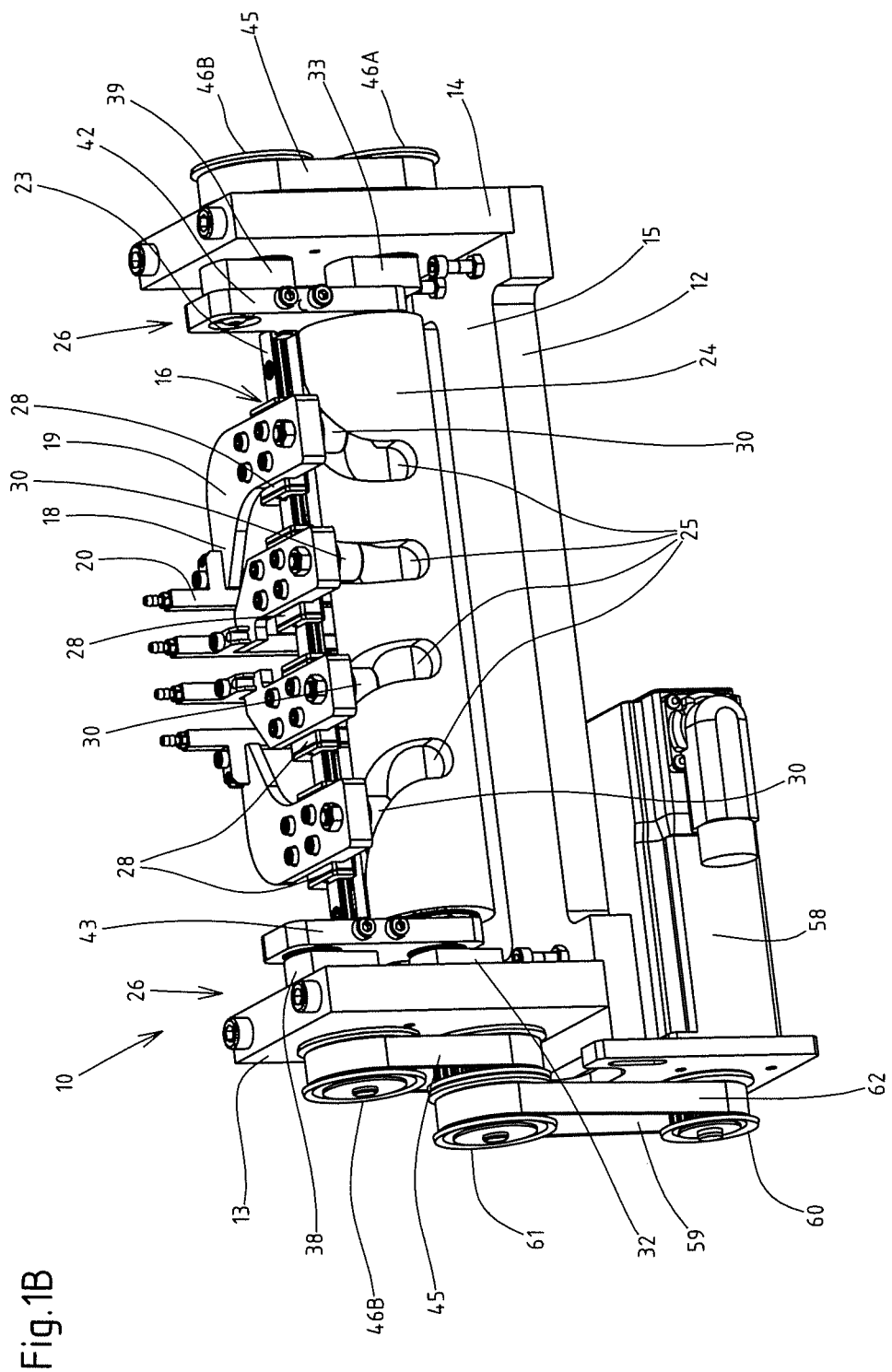

Turning to FIGS. 1A, 1B, 2, 3A, 3B, 4A, 4B, 5 and 6, a first embodiment of the pick-and-place device 10 according to the invention is shown. The pick-and-place device 10 is constructed for picking up and placing multiple objects simultaneously, in particular parts of simulated smoking devices.

The pick-and-place device 10 comprises a base frame 12. The base frame 12 comprises a right post 13, a left post 14 and a base plate 15. The pick-and-place device 10 comprises a support unit 16 supported by the base frame 12 and configured for supporting a plurality of arms 18. In this case there are four arms, but a different number is possible.

Each arm 18 comprises a first arm part 19 and a second arm part 20 which are fixed to one another.

The first arm part extends horizontally and the second arm part extends vertically, but another configuration is also possible.

Figure 4B:
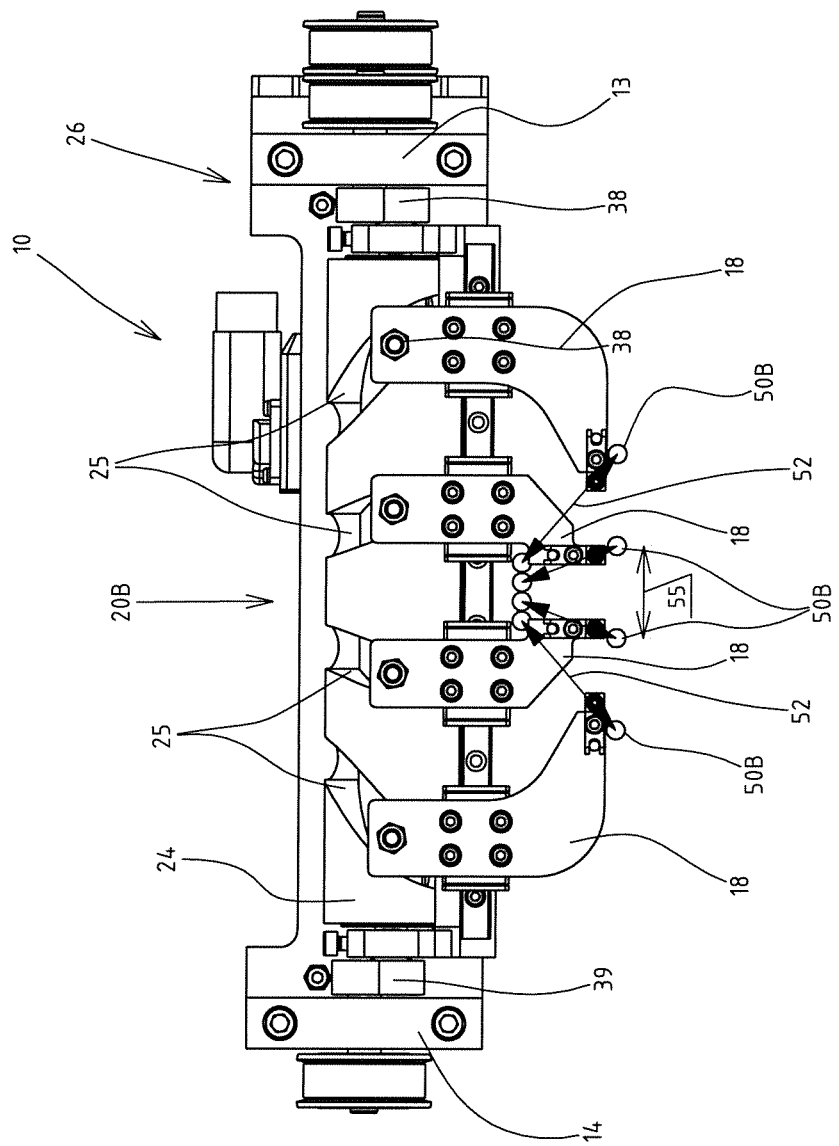
FIG. 4B shows a top view of the first embodiment of the invention in a second position.

The support unit 16 is constructed to be moved relative to the base frame along a support unit trajectory 21 (shown in FIG. 5) between and beyond a first support position shown in FIG. 4A and a second support position shown in FIG. 4B. (the second position in FIG. 4b is not yet the end position).

Figure 3B:
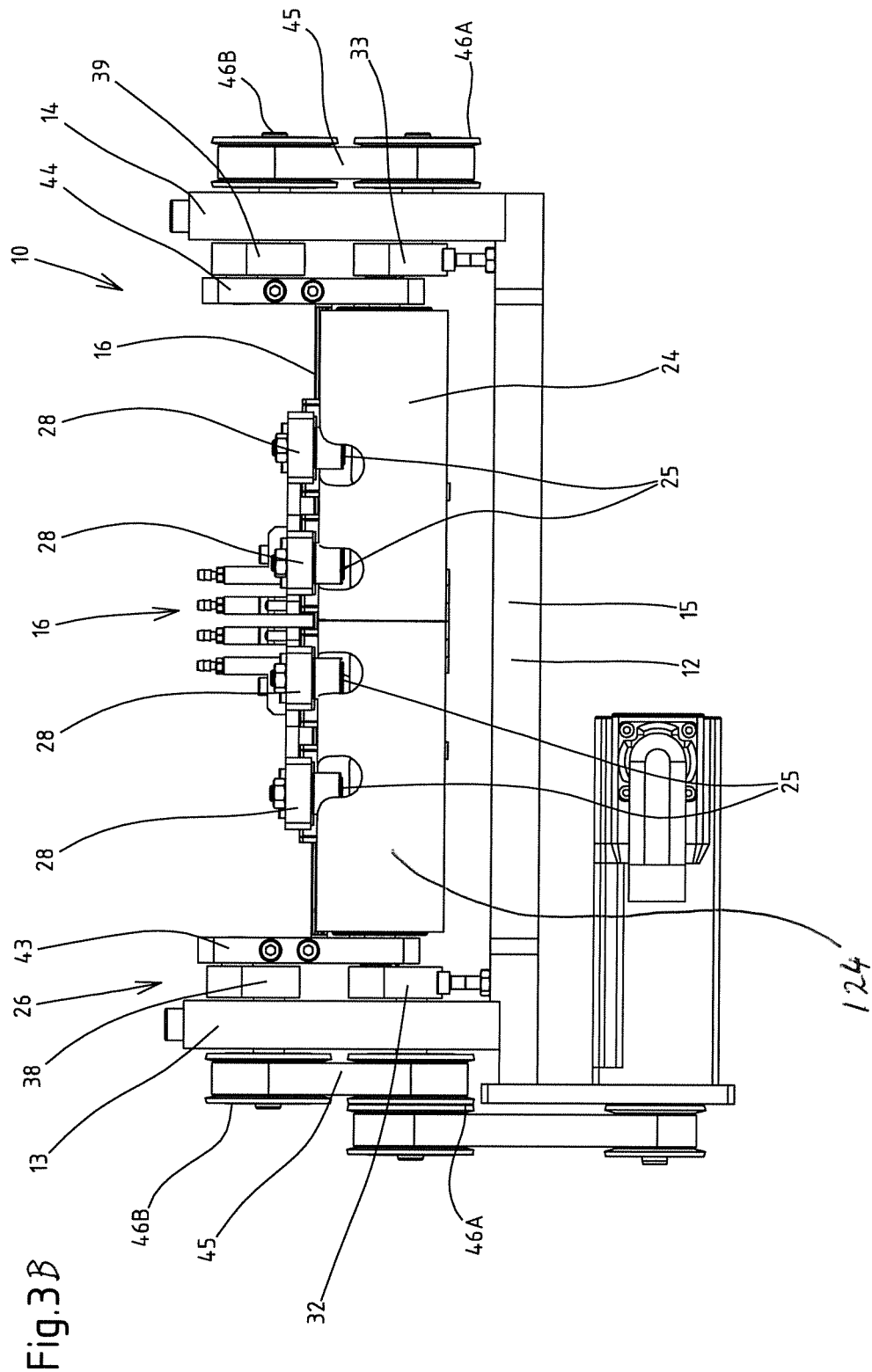
FIG. 3B shows a rear view of a fifth embodiment of the invention.

The support unit comprises a support unit base 22 and a traveller track 23 which is mounted to the support unit base 22. The support unit further comprises at least one cam track body 24 which is rotatably mounted to the support unit base 22. FIG. 3B shows a fourth embodiment with two cam track bodies 24, 124. The at least one cam track body 24 is located in a lower region of the support unit. The movable arms are located above the at least one cam track body. Multiple rotatable cam tracks 25 are defined in the at least one cam track body.

Figure 2:
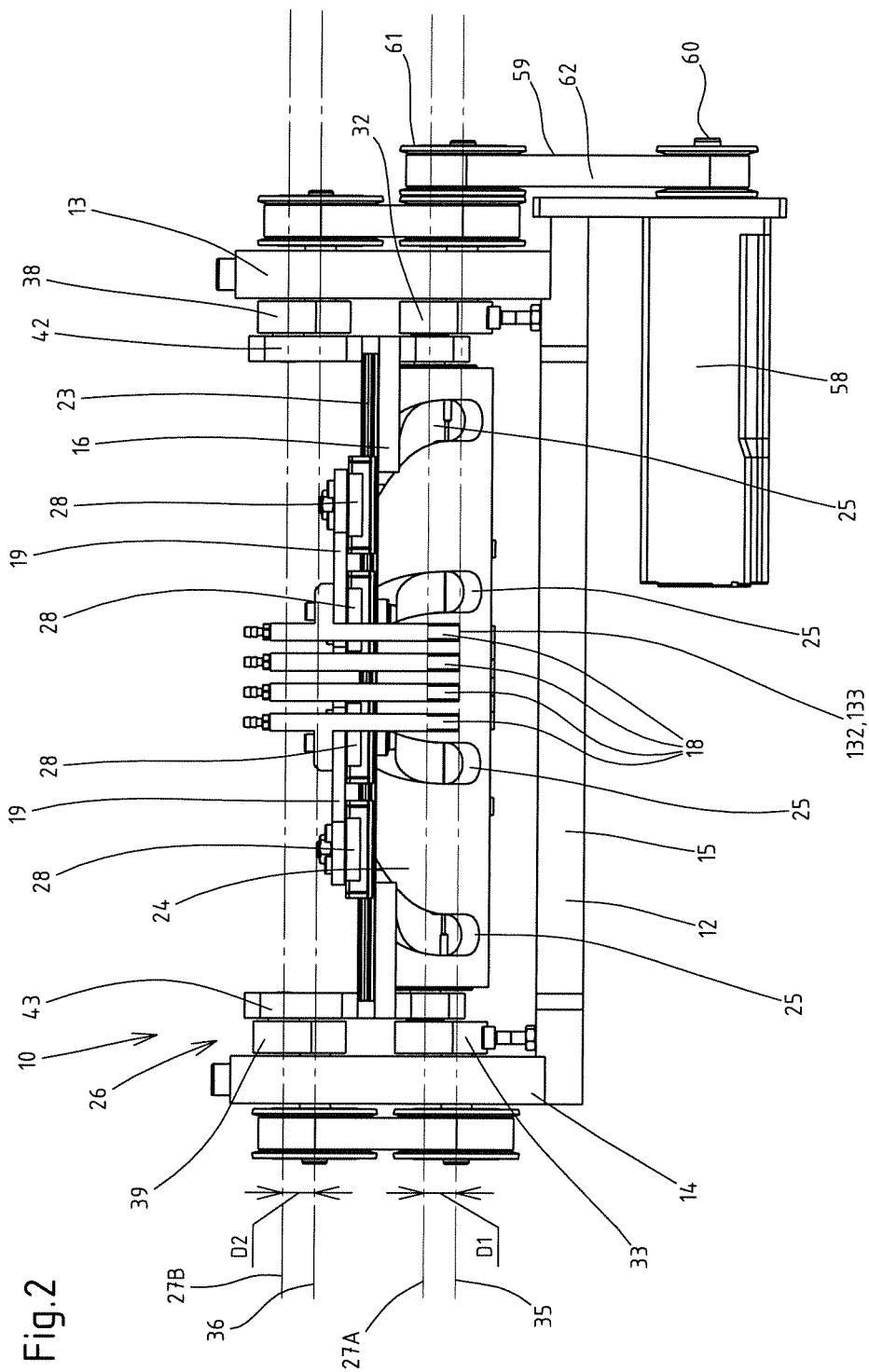
FIG. 2 shows a front view of the first embodiment of the invention.

The at least one cam track body 24 is rotatable relative to the support unit base between a first cam track position and a second cam track position about an eccentric member axis 35, see in particular FIG. 2. The at least one cam track body 24 is connected in a fixed manner to a right and left eccentric member 32, 33. The eccentric member axis 35 may also be referred to as the first eccentric member axis 35, since there is also a second eccentric member axis, as will be discussed below.

The at least one cam track body is a cylinder, the cam tracks 25 being grooves in said cylinder. The cam tracks 25 are diverging.

The pick-and-place device 10 comprises a coupling device 26 via which the support unit 16 is connected to the base frame. The coupling device 26 couples the rotation of the at least one cam track body 24 about the eccentric member axis 35 to the movement of the support unit. The coupling device 26 forces the cam track body 24 to rotate during the movement of the support unit.

The multiple movable arms 18 are connected to and supported by the support unit 16. Each movable arm 18 extends outwardly away from the support unit. Each movable arm 18 comprises a traveller 28 configured for travelling along said traveller track 23 between a first traveller position and a second traveller position. Each arm 18 is supported by the support unit 16 via the traveller 28. The traveller 28 may be a slider or a roller.

Each movable arm comprises a cam 30 configured to move in a rotatable cam track 25 which is associated with said movable arm.

Each movable arm 18 further comprises a pickup member 132 connected to a free end 133 of each arm. The pickup members are shown and elucidated with respect to FIG. 19. The pickup members 132 are configured to pick up an object 5 and to move said object from a first location to a second location.

Each moveable arm 18 is constructed to move back and forth between a respective first arm position and a respective second arm position along the traveller track as a result of the interaction between the cam 30 and the cam track 25 during the movement of the support unit 16 between the first support position and the second support position.

The base frame 12 comprises the right post 13 and the left post 14. The support unit 16 is pivotably connected to the left and right post. The coupling device 26 comprises a right eccentric member 32 and a left eccentric member 33 in the form of pivotable arms. The support unit 16 is pivotably connected to said right post and left post via the right eccentric member 32 and the left eccentric member 33. The right and left eccentric members 32, 33 are pivotable relative to the left and right posts about an eccentric member axis 35, see in particular FIG. 2.

The at least one cam track body 24 is connected to the left and right eccentric members 32, 33 and is fixed to the left and right eccentric member and pivotable about the eccentric member axis 35. The cam track axis 27A is offset over a distance D1 from the eccentric member axis 35 and pivots around the eccentric member axis.

The cam track axis 27A is defined by the ends of the left and right eccentric members 32,33. The cam track body 24 is fixed to the cam track axis 27A. The left and right eccentric members 32, 33 and with that the cam track body 24 rotate around the eccentric member axis.

The posts define the eccentric member axis 35 and a second eccentric member axis 36 which is parallel to the eccentric member axis 35. The coupling device 26 further comprises a second right eccentric member 38 which is positioned above the right eccentric member 32 and a second left eccentric member 39 which is positioned above the left eccentric member 33.

The second right eccentric member 38 and the second left eccentric member 39 are pivotable relative to the left and right post about the second eccentric member axis 36. The second right eccentric member 38 and the second left eccentric member 39 define a second axis 27B.

The traveller track 23, the cam track axis 27A, the second axis 27B, the eccentric member axis 35 and the second eccentric member axis 36 extend horizontally. The eccentric member axis 35 is positioned vertically below the second eccentric member axis 36.

The support unit 16 comprises a right beam 42 and a left beam 43 positioned at the right and left side of the support unit. The right beam 42 is pivotably connected to the second right eccentric member 38 and the right eccentric member 32 and the left beam 43 is pivotably connected to the second left eccentric member 39 and the left eccentric member 33.

The four eccentric members 32, 33, 38, 39 define the circular trajectory of the support unit 16 and the rotation of the at least one cam track body 24 relative to the support unit 16.

Figure 6:
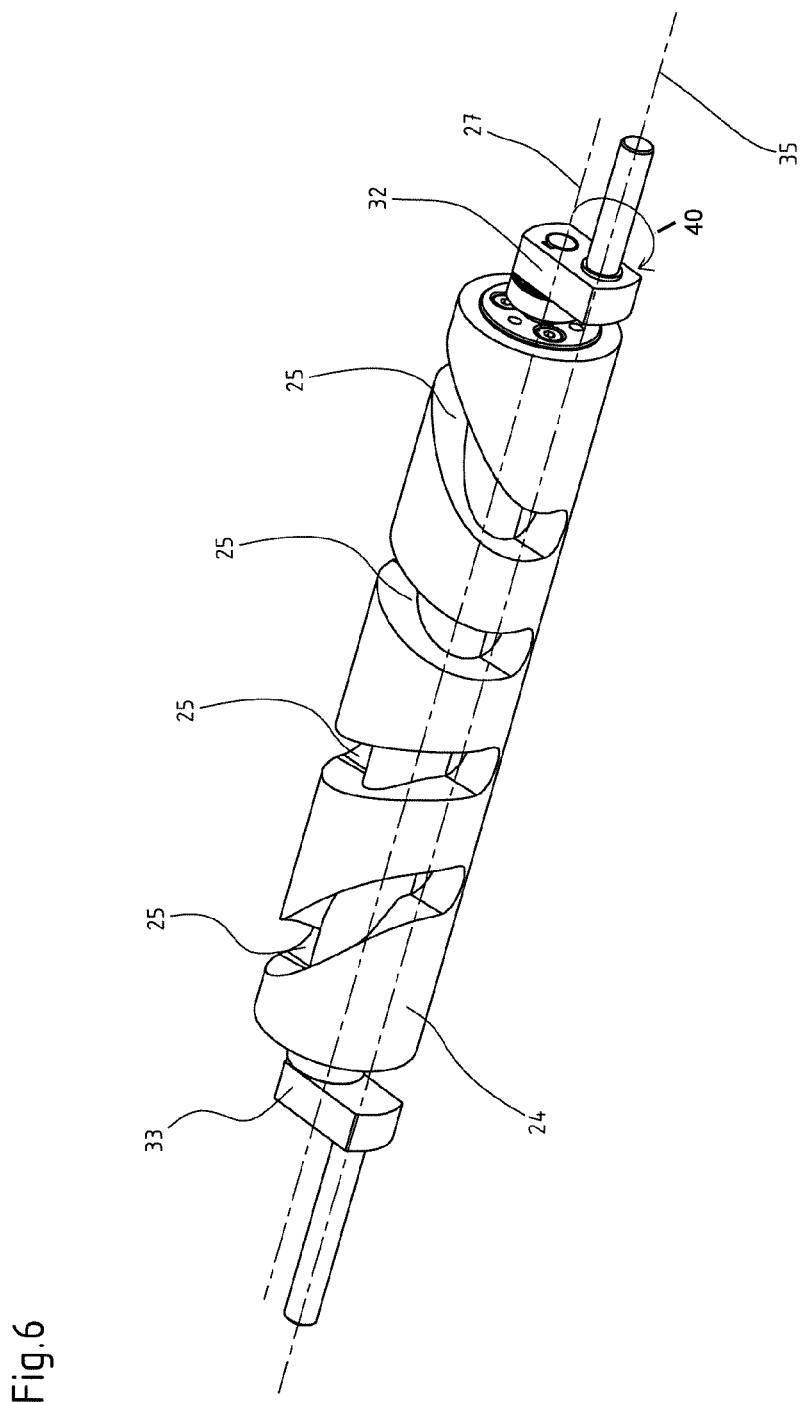
FIG. 6 shows an isometric view of the cam track body.
Figure 7:
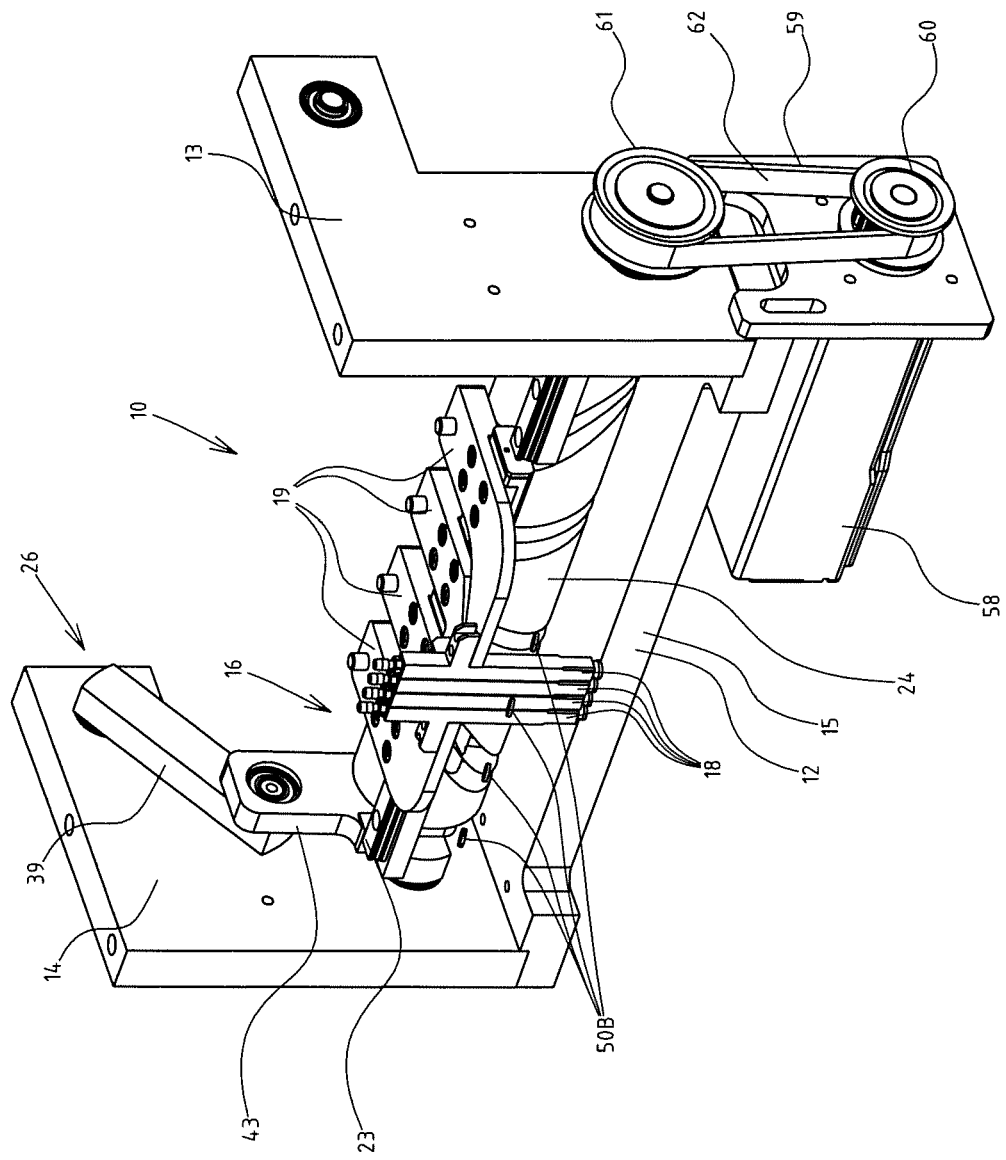
FIG. 7 shows an isometric view of a second embodiment of the invention in a first position.
Figure 8:
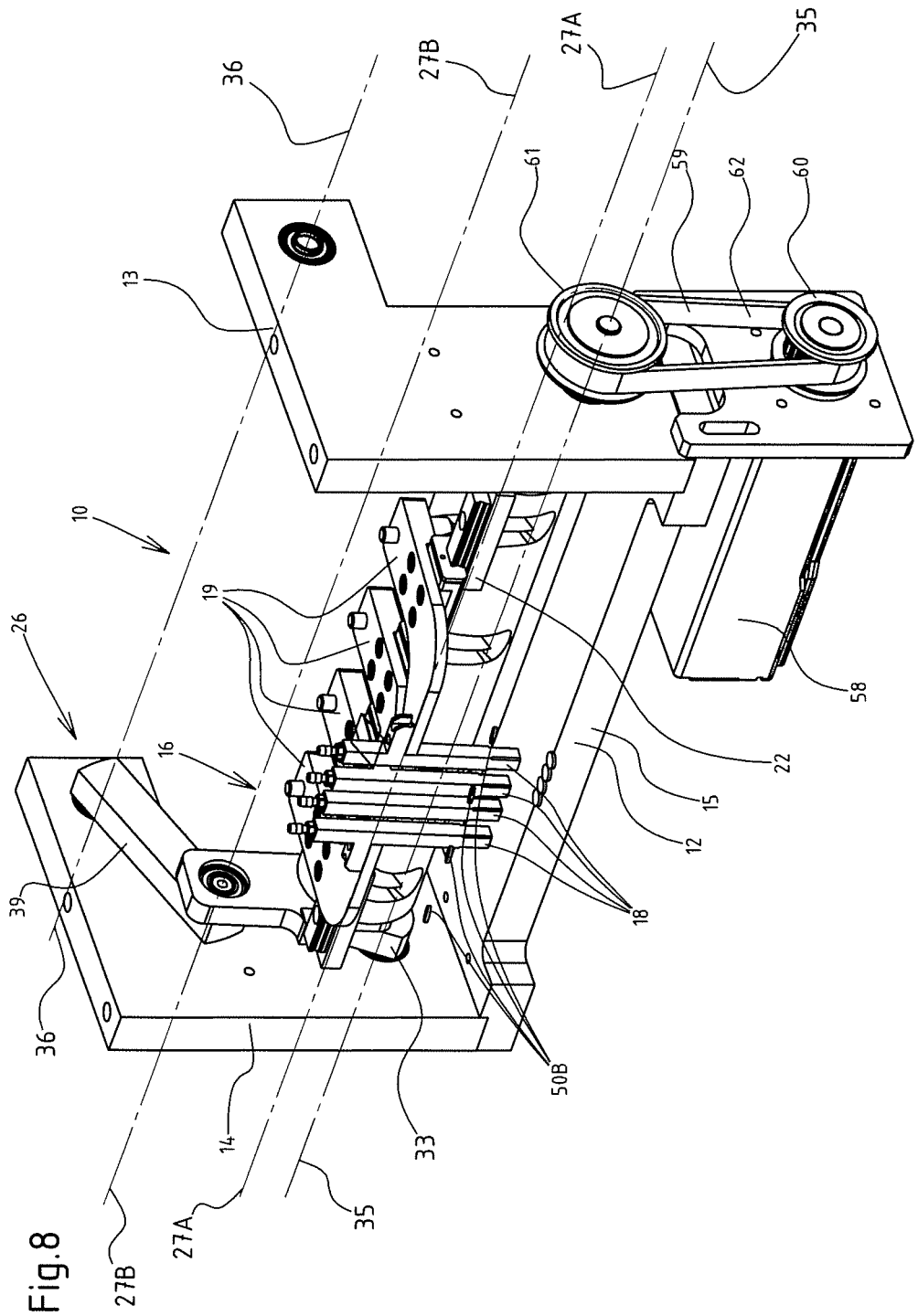
FIG. 8 shows an isometric view of the second embodiment of the invention in second position.
Figure 9:
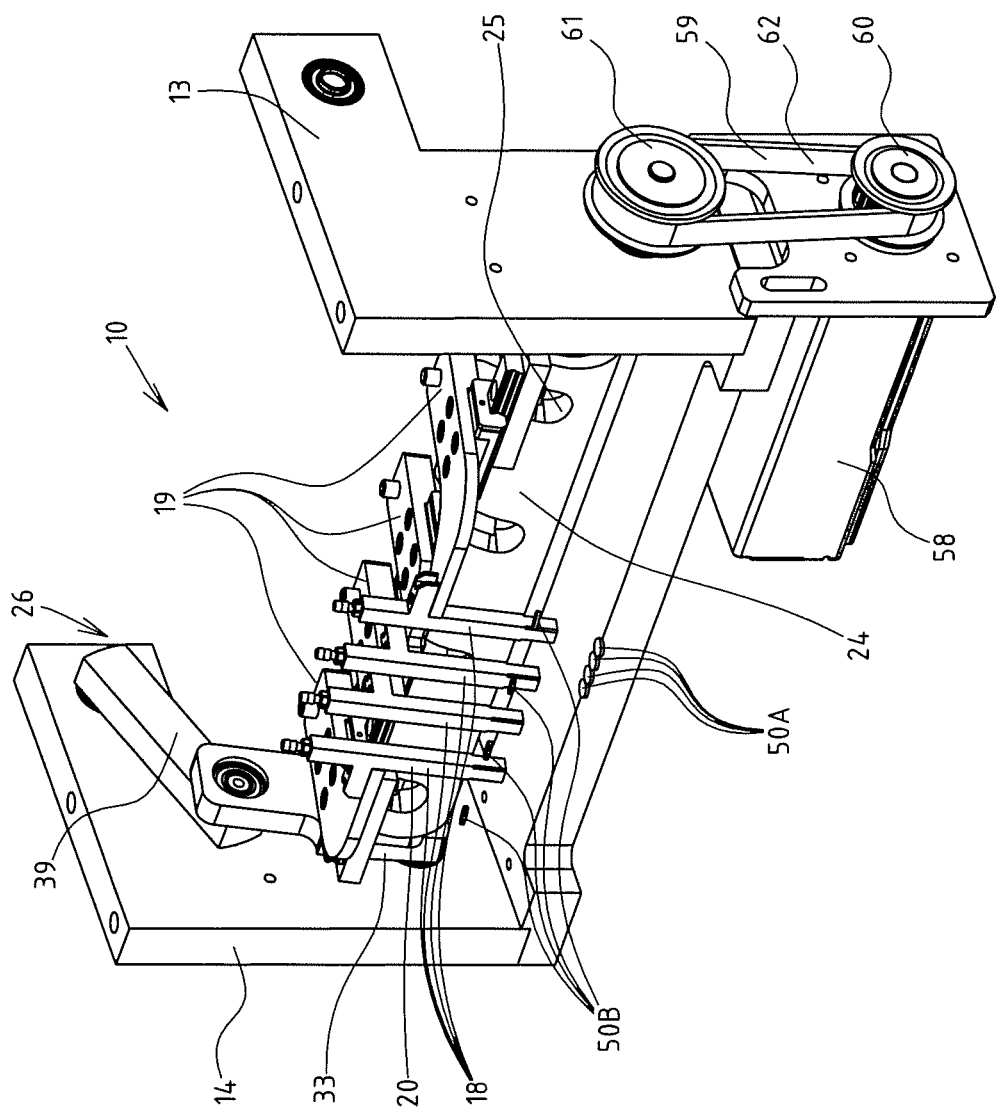
FIG. 9 shows an isometric view of the second embodiment of the invention in a third position.
Figure 10:
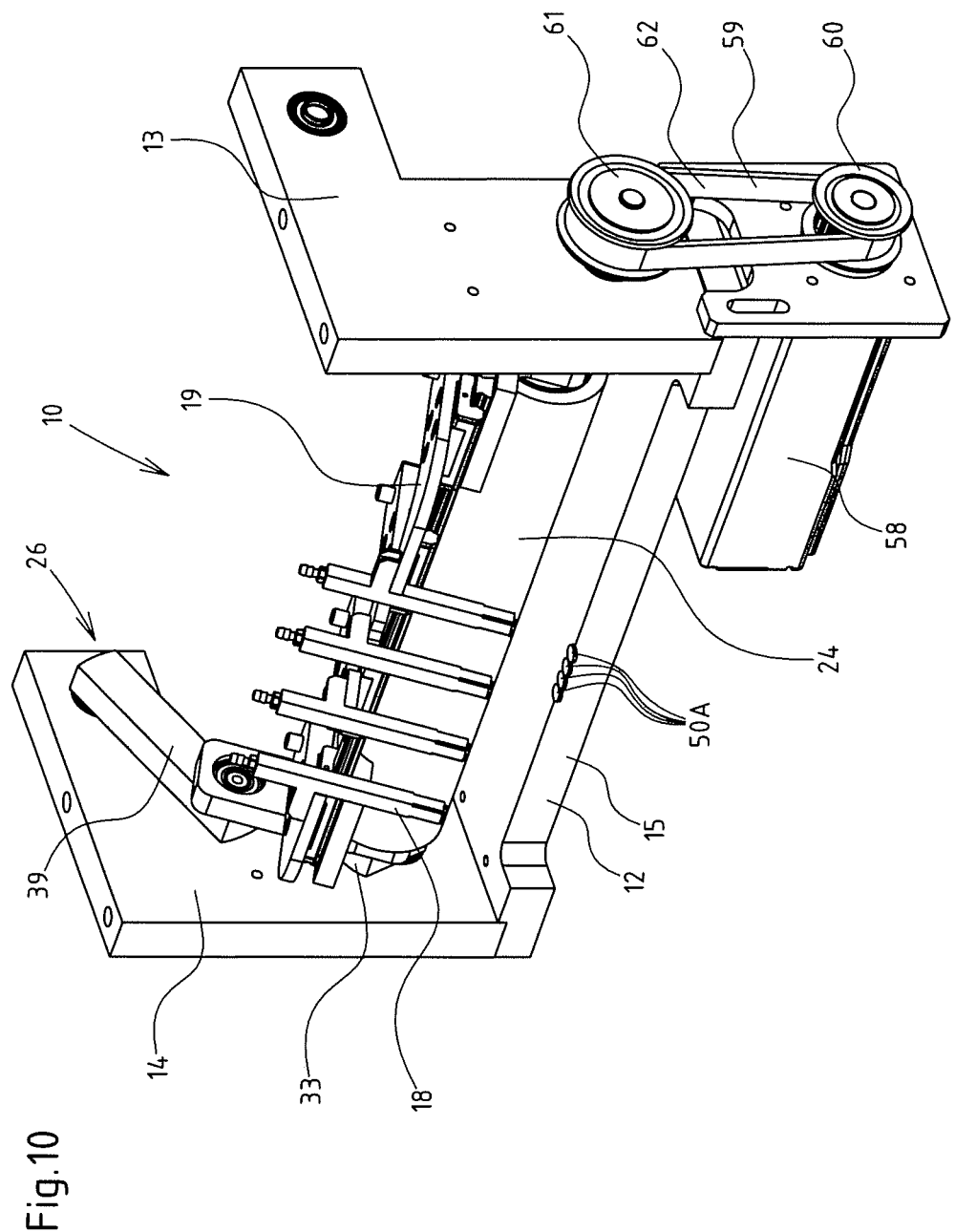
FIG. 10 shows an isometric view of the second embodiment of the invention in a fourth position.
Figure 11:
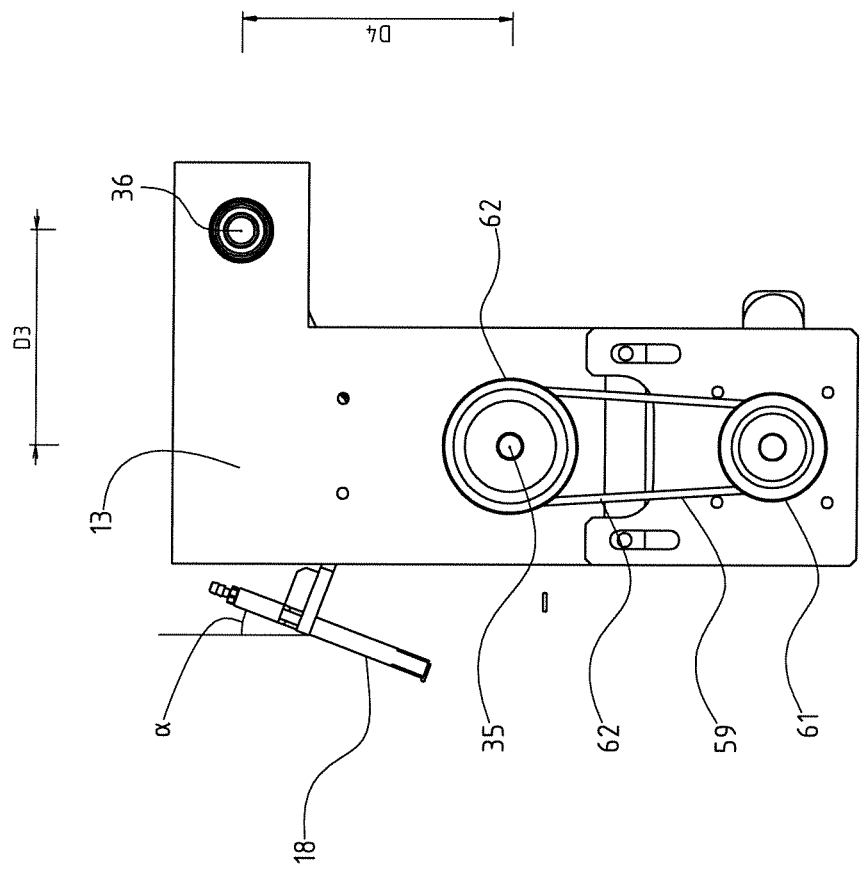
FIG. 11 shows an side view of the second embodiment of the invention in the fourth position.
Figure 12:
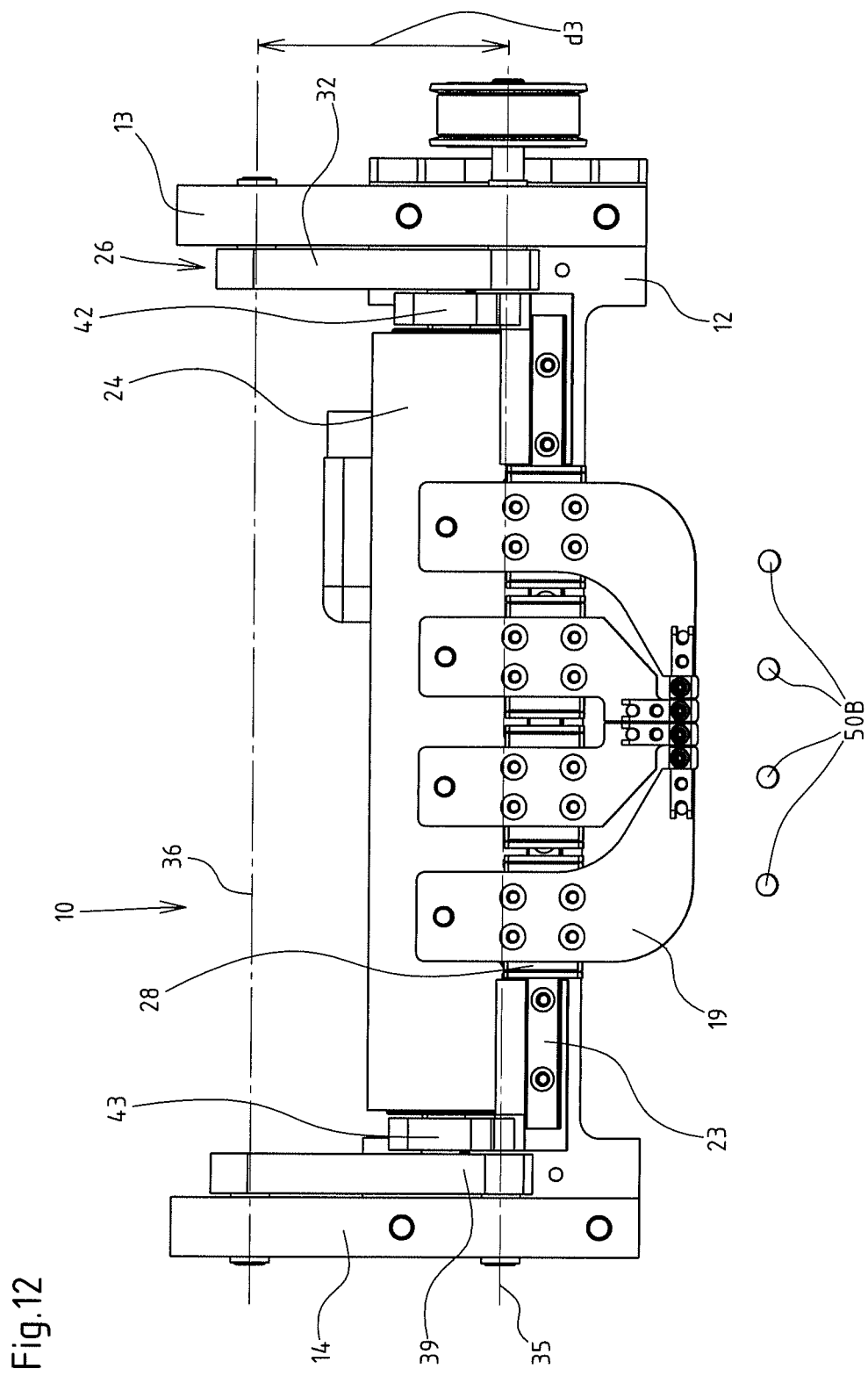
FIG. 12 shows a top view of the second embodiment of the invention in the first position.
Figure 13:
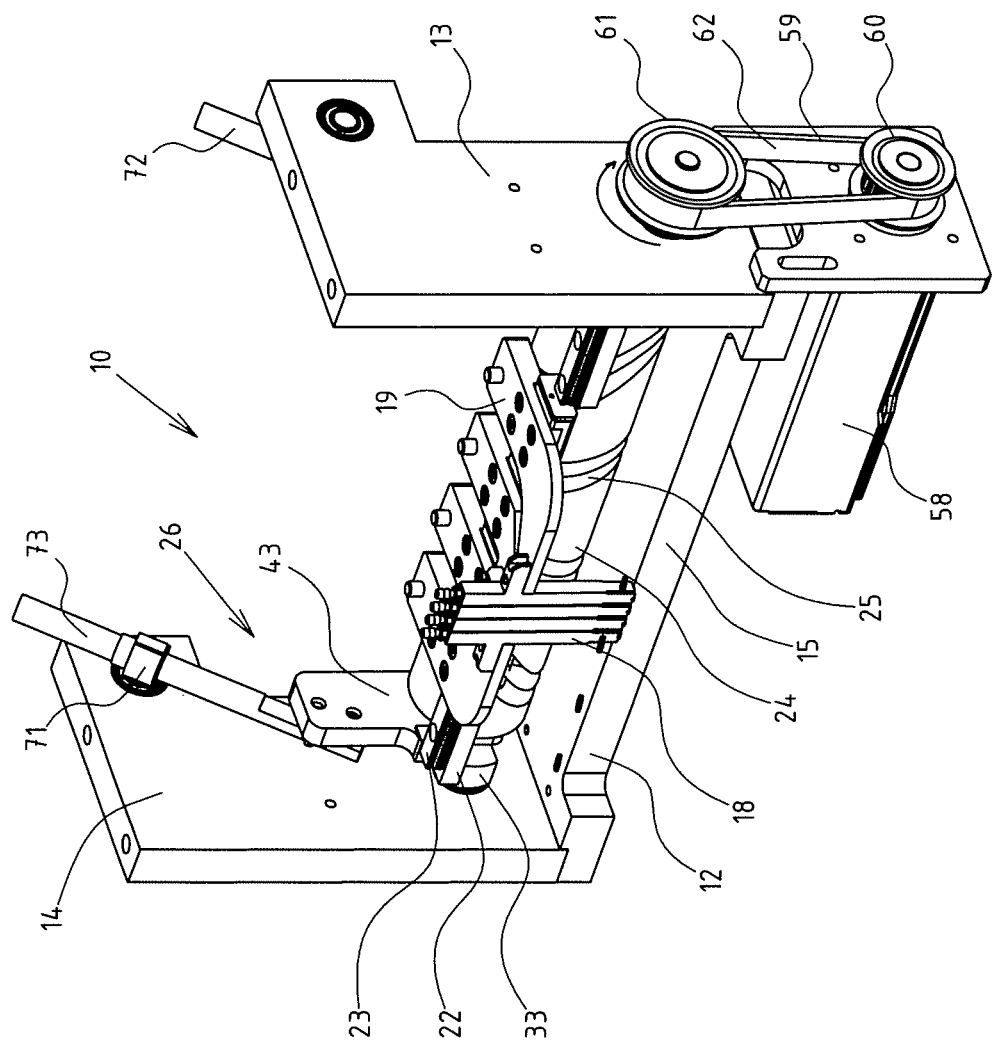
FIGS. 13-16 show isometric views of a third embodiment in consecutive positions.
Figure 14:
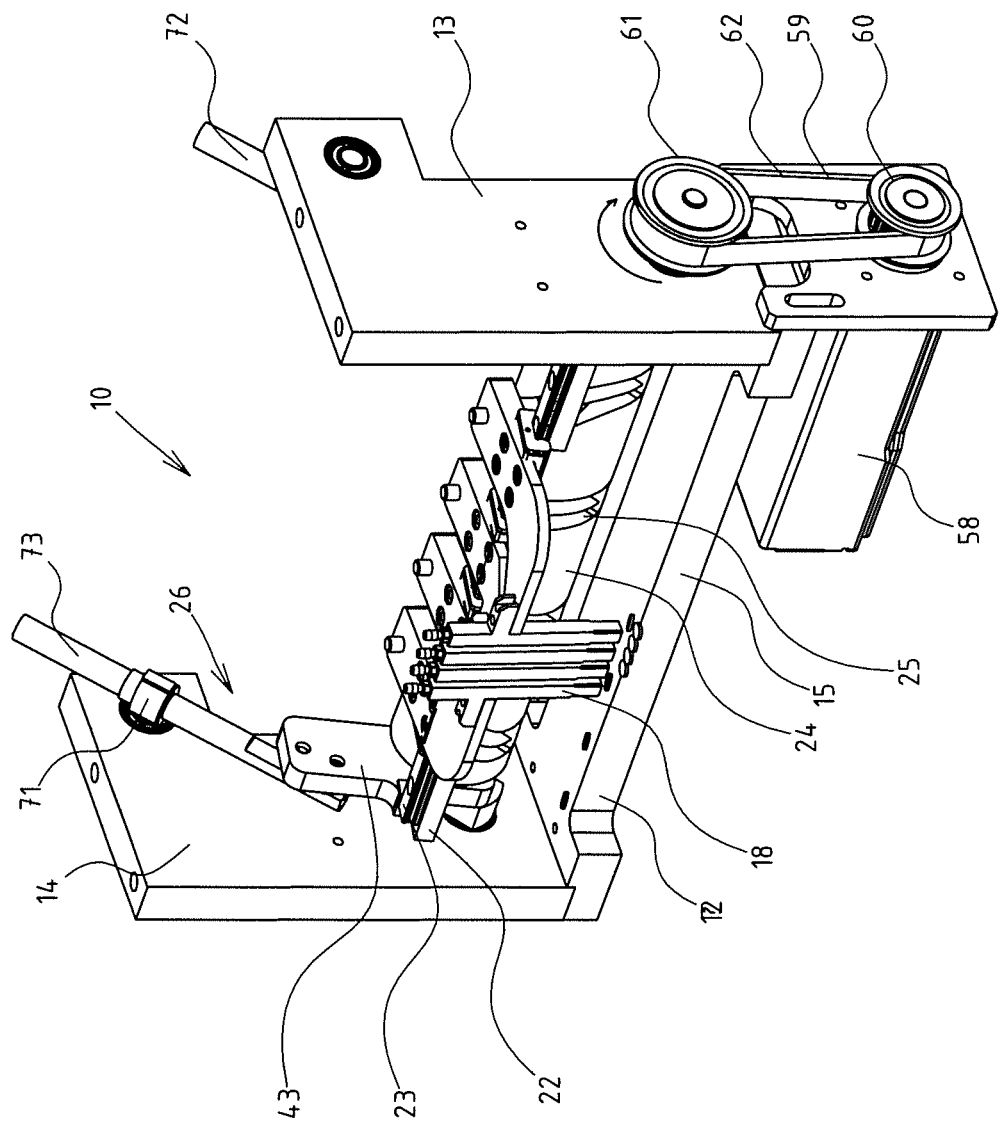
Figure 15:
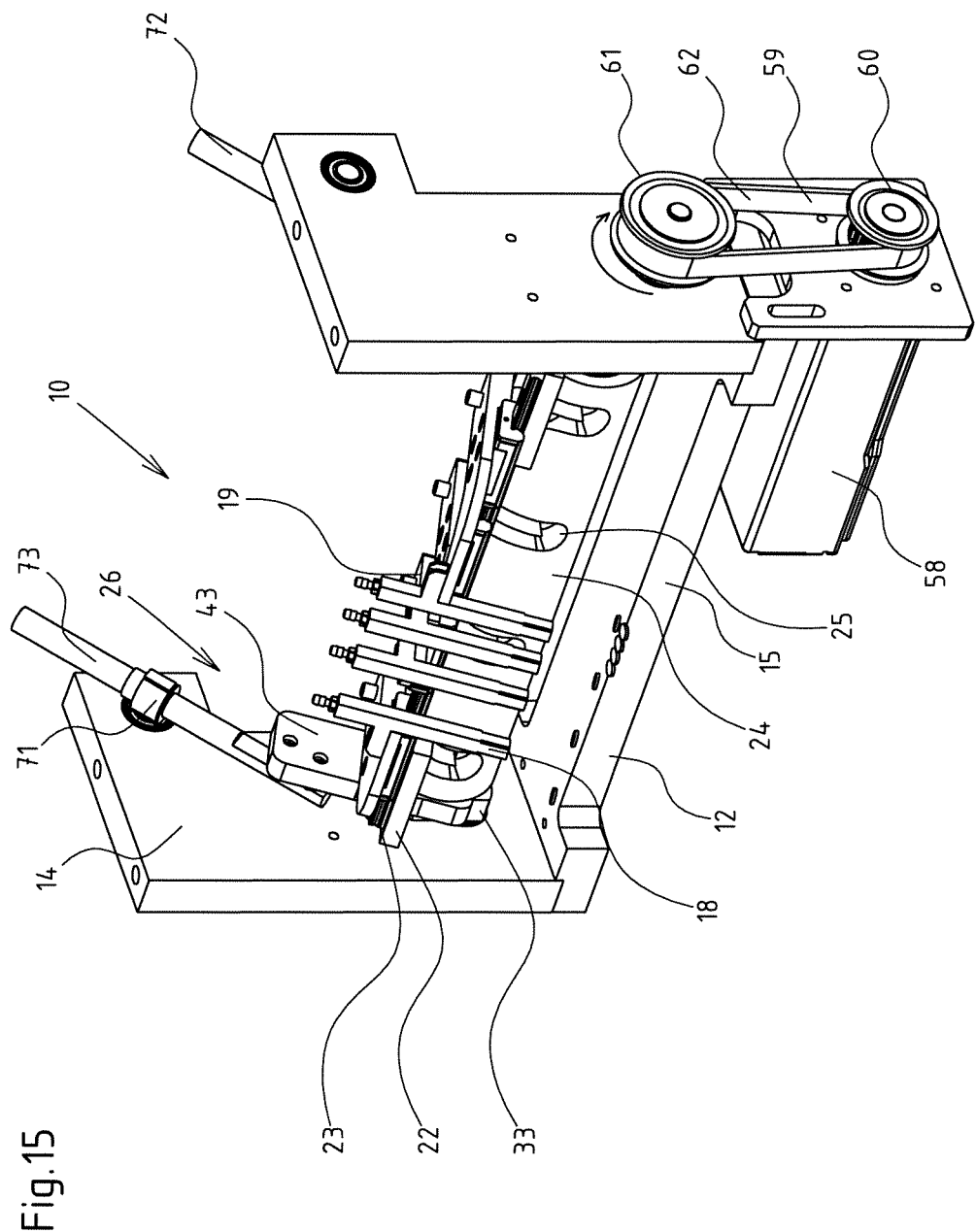
Figure 16:
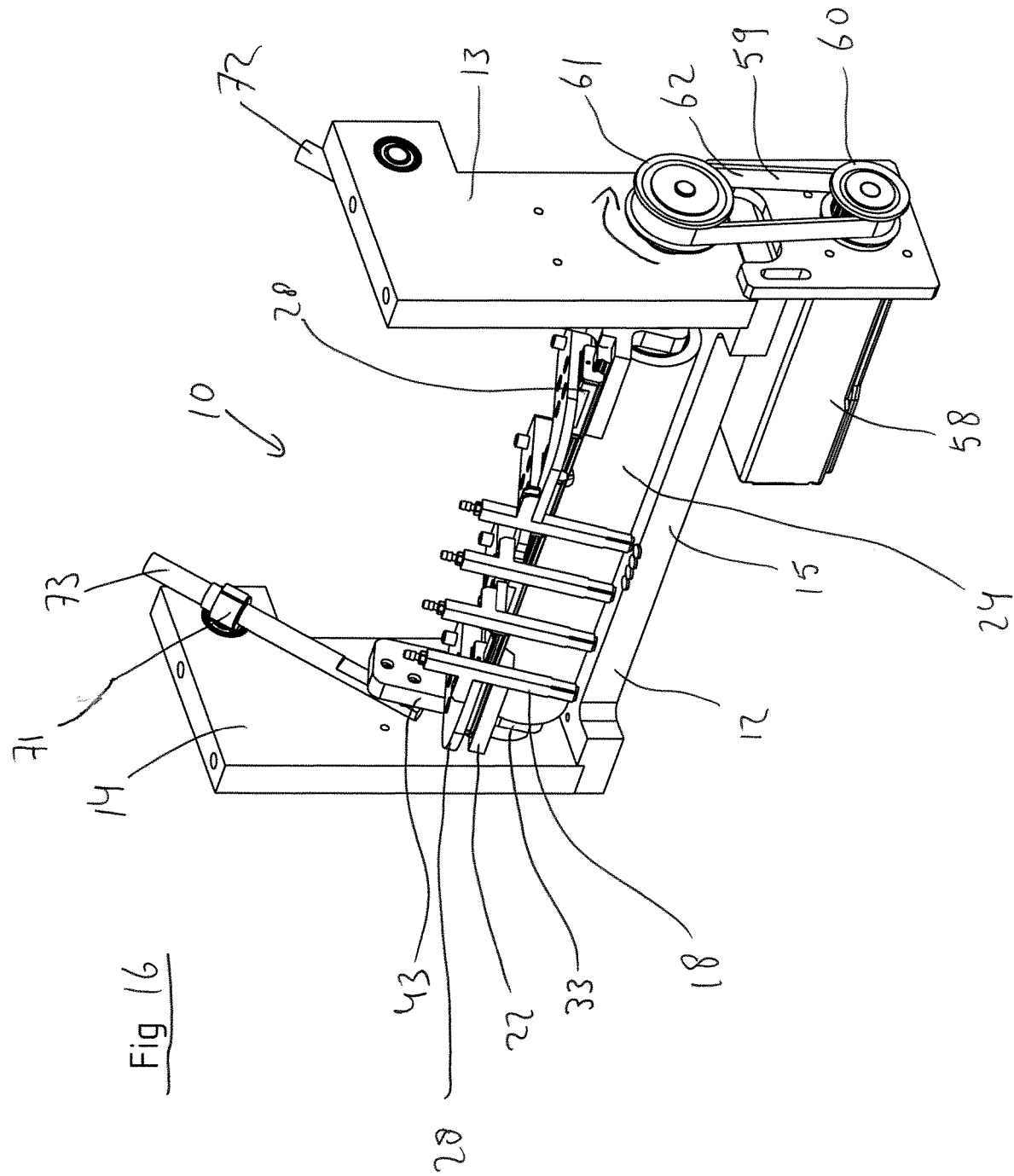
Figure 17:
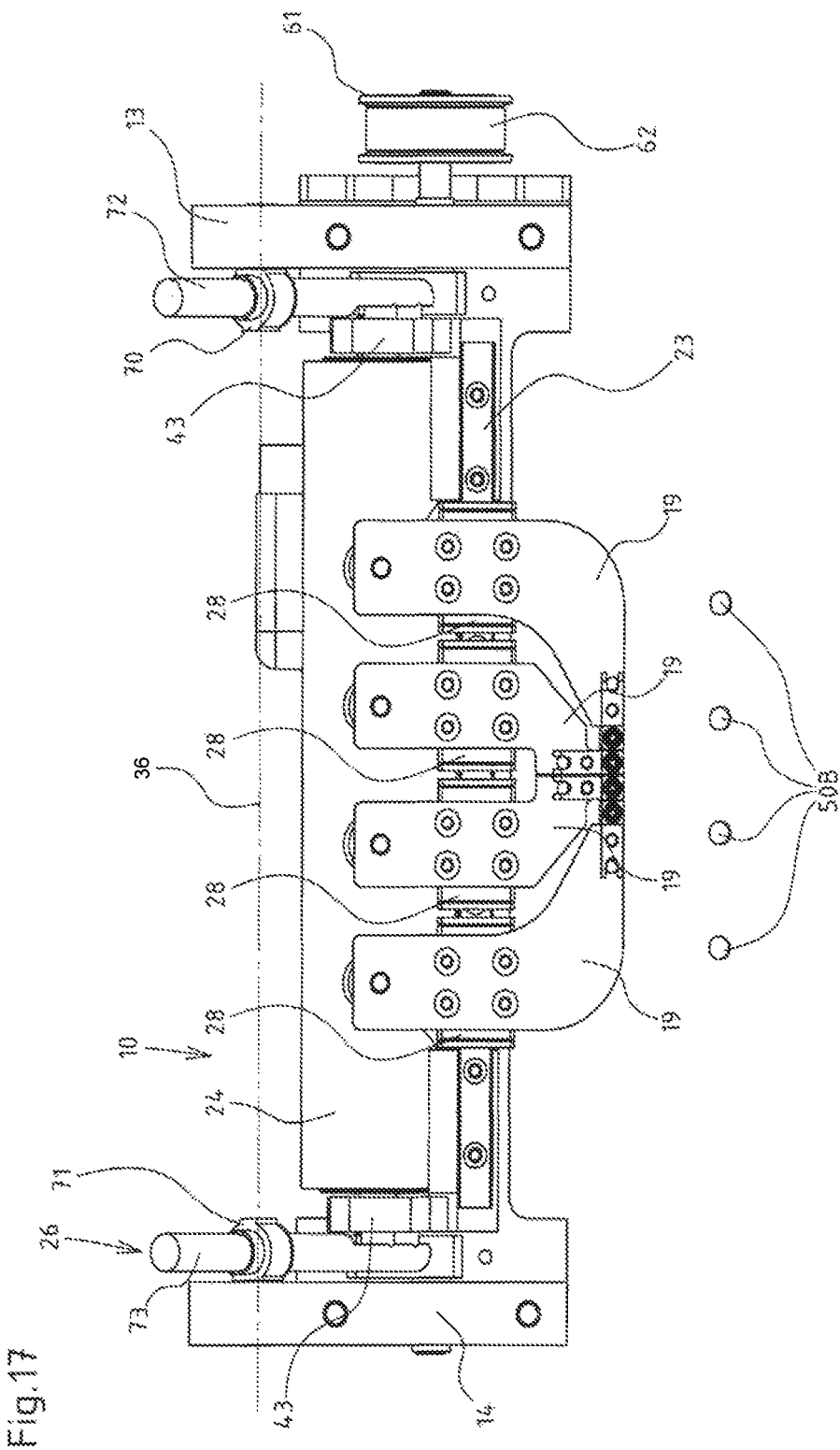
FIG. 17 shows a top view of the third embodiment.
Figure 18:
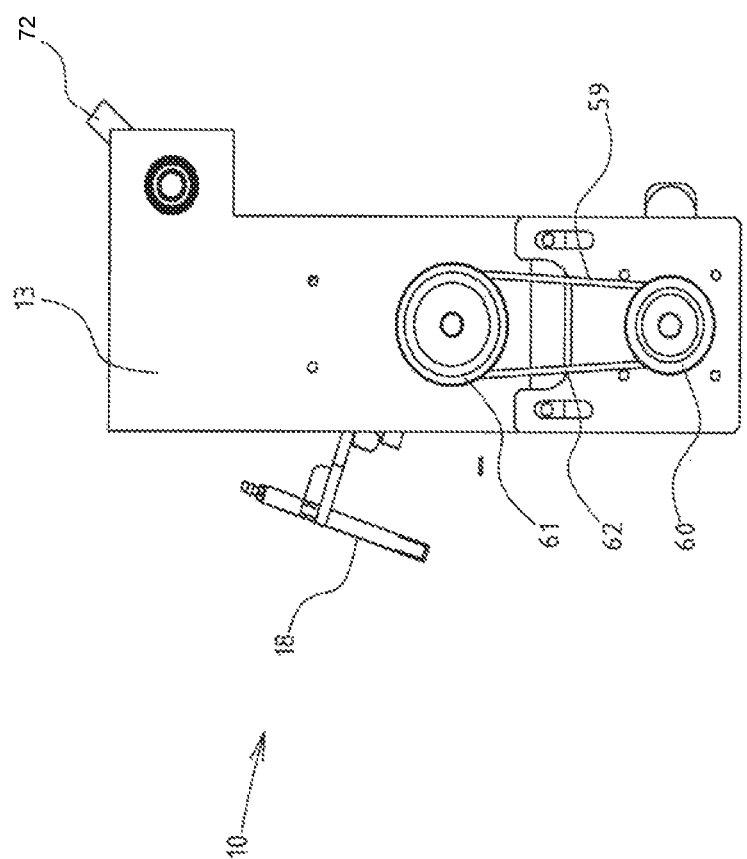
FIG. 18 shows a side view of the third embodiment.

In operation, the cam track axis 27A and the second axis 27B rotate about the eccentric member axis 35 as indicated by arrow 40 in FIG. 6. The cam track axis 27A is parallel to the traveller track 23.

The coupling device 26 comprises a rotation coupling member 45 in the form of an endless belt which couples the second left eccentric member 39 to the left eccentric member 33 and/or couples the second right eccentric member 38 to the right eccentric member 32 in order to keep the second left and right eccentric members in a same rotational position as the left and right eccentric members during the movement of the support unit along the support unit trajectory. The endless belt is positioned around respective pulleys 46. An endless belt is provided on both sides in order to ensure that both second right and left eccentric members are coupled to the right and left eccentric member respectively. It will be clear that the same kind of coupling of the rotational movement can be provided with gears.

Turning to FIGS. 4A and 5, in the side view of FIG. 5 the support unit trajectory 21 is shown. The support unit trajectory 21 is curved, more in particular circular. The support unit trajectory 21 forms a semi-circle, but may also have a different shape. The support unit trajectory is aligned with a first plane 47 (shown in FIG. 4A). The arms move in a second plane relative to the support unit. The second plane may be a horizontal plane. It will be clear that the second plane moves with the support unit.

The traveller track 23 is straight and defines a linear movement of the arms 18 between and beyond the respective first traveller positions and the second traveller positions. (the position shown in FIG. 4B is not the end position) The traveller track 23 is oriented at right angles to said first plane 47. The direction of movement of the arms 18 is also oriented at right angles to the first plane, see arrow 48 in FIG. 4A. Each movable arm is configured to move in a direction parallel to the traveller track 23.

The pick-and-place device 10 comprises a single drive 58 and a transmission mechanism 59. The drive 58 is constructed to move the support unit 16 between the first support position and the second support position and the coupling device 26 rotates the at least one cam track body 24 during said movement. The transmission 59 comprises a first pulley connected to the drive, a second pulley 61 connected to the right eccentric member 32, and an endless belt 62.

The single drive 58 pivots all four eccentric members 32, 33, 38, 39 between a first and second angular position.

Operation

In operation, the pickup members are moved from respective first positions 50A (see FIG. 1A) to respective second positions 50B (see FIG. 1A) over respective curved paths 52 (see FIG. 4B). The paths which in particular may be curved are movements composed of two separate movements:
  the movement of the support unit 16 relative to the base frame, which may be a circular movement or a composite movement,
  the movement of the arms 18 relative to the support unit 16, which may be a linear movement or a rotary movement.

It will be clear that the radius of the circular movement of the support unit 16 is defined by the distance D1 between the cam track axis 27A and the eccentric member axis 35, which is the same as a distance D2 between the second axis 27B and the second eccentric member axis 36. Obviously, the right beam 42 and the left beam 43 make the same movement as the support unit 16.

During the movement of the arms 18 from the respective first traveller positions to the second traveller positions, the arms move away from one another, increasing a distance 55 (see FIG. 4B) between the pickup members 132. In the second traveller positions the pickup members 132 are positioned further from the first and second axis than in the first traveller positions. Obviously, if the cam tracks 25 have a different shape, a different movement such as a converging movement is possible.

Figure 19:
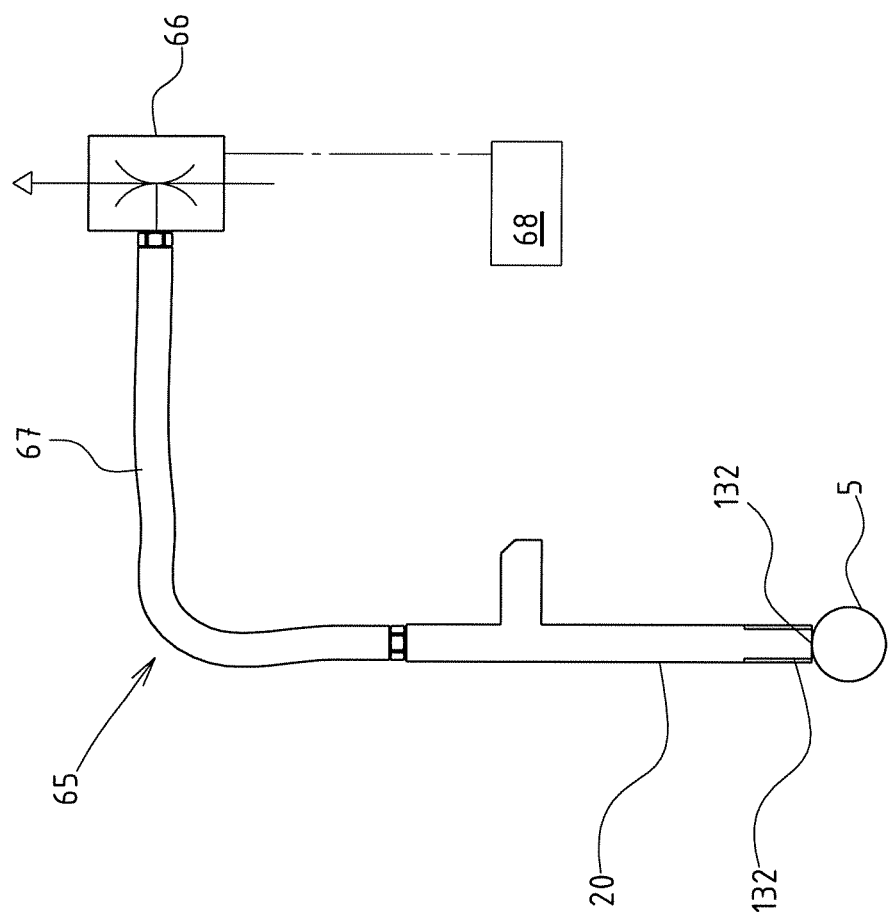
FIG. 19 shows a diagrammatic view of the suction device.

Turning to FIG. 19, the pick-and-place device 10 comprises a suction device 65. The suction device comprises a suction pump 66 and suction conduits 67 extending from the suction pump 66 to pickup members 132 in the form of suction nozzles. The pick-and-place device 10 comprises a control system 68 for controlling the suction at the suction nozzles.

FIG. 19 also shows the objects 5 which are picked and placed by the pickup members 132.

The invention therefore relates to a method of picking and placing, the method comprising:
  picking a plurality of objects at respective first object positions 50A with a pick-and-place device 10 according to the invention,
  moving the support unit 16 from the first support position to the second support position, wherein during said movement the at least one rotatable cam track body rotates relative to the support unit, and wherein each moveable arm moves from the first respective traveller position to the second respective traveller position as a result of the interaction between the cam and the cam track, and
  placing the objects at respective second object positions 50B.

Second Embodiment

Turning to FIGS. 7-12, 6, a second embodiment of the pick-and-place device 10 is shown. This embodiment has a second right eccentric member and a second left eccentric member which rotate about a second eccentric member axis 36 which is both vertically and horizontally offset from the eccentric member axis 35. It is horizontally offset over a distance D3 and vertically over a distance D4.

Furthermore, the distance D2 between the second axis 27B and the second eccentric member axis 36 is greater in this embodiment than the distance D1 between the cam track axis 27A and the eccentric member axis 35. In other words, eccentric members 38,39 are longer than eccentric members 32, 33.

This results in a different movement of the support unit 16. The support movement 16 does not make a simple circular movement but makes a composite movement. The bottom region of the support unit including the cam track body 24 follows the circular trajectory of the cam track axis 27A about the eccentric member axis 35. The top region of the support unit 16 follows the circular trajectory of the second axis 27B about the second eccentric member axis 36. See in particular FIG. 8.

This means that the support unit 16 itself will not remain vertical during its movement, but will have a varying orientation during its movement. The support unit 16 will become tilted. This is visible in FIGS. 7-10 and indicated with angle α in FIG. 11.

Third Embodiment

Turning to FIGS. 13-18, 6, a third embodiment is disclosed. The third embodiment has a right guide 70 and a left guide 71 in the form of linear bearings. The right guide 70 and left guide 71 are pivotably mounted to respectively the right post 13 and the left post 14 and can pivot about a common pivot axis 36.

A right rod 72 and a left rod 73 extend from the support body upward to the right guide 70 and the left guide 71 and extend through the linear bearings. The rods 72, 73 are arranged in a sliding manner with respect to the right guide 70 and left guide 71. The rods 72, 73 are connected in a fixed manner to the support unit 16. The support unit pivots when the drive 58 rotates the right and left eccentric members 32,33.

The third embodiment does not have a second right and left eccentric members. Instead it has the rods 72,73 and the guides 70,71.

The cam track body 24 is rotatably connected to the left and right post via the right and left eccentric member and has only a single degree of freedom of movement relative to the left and right post, the single degree of freedom being the rotation about the eccentric member axis 35. (see FIG. 6)

Fourth Embodiment

Figure 20:
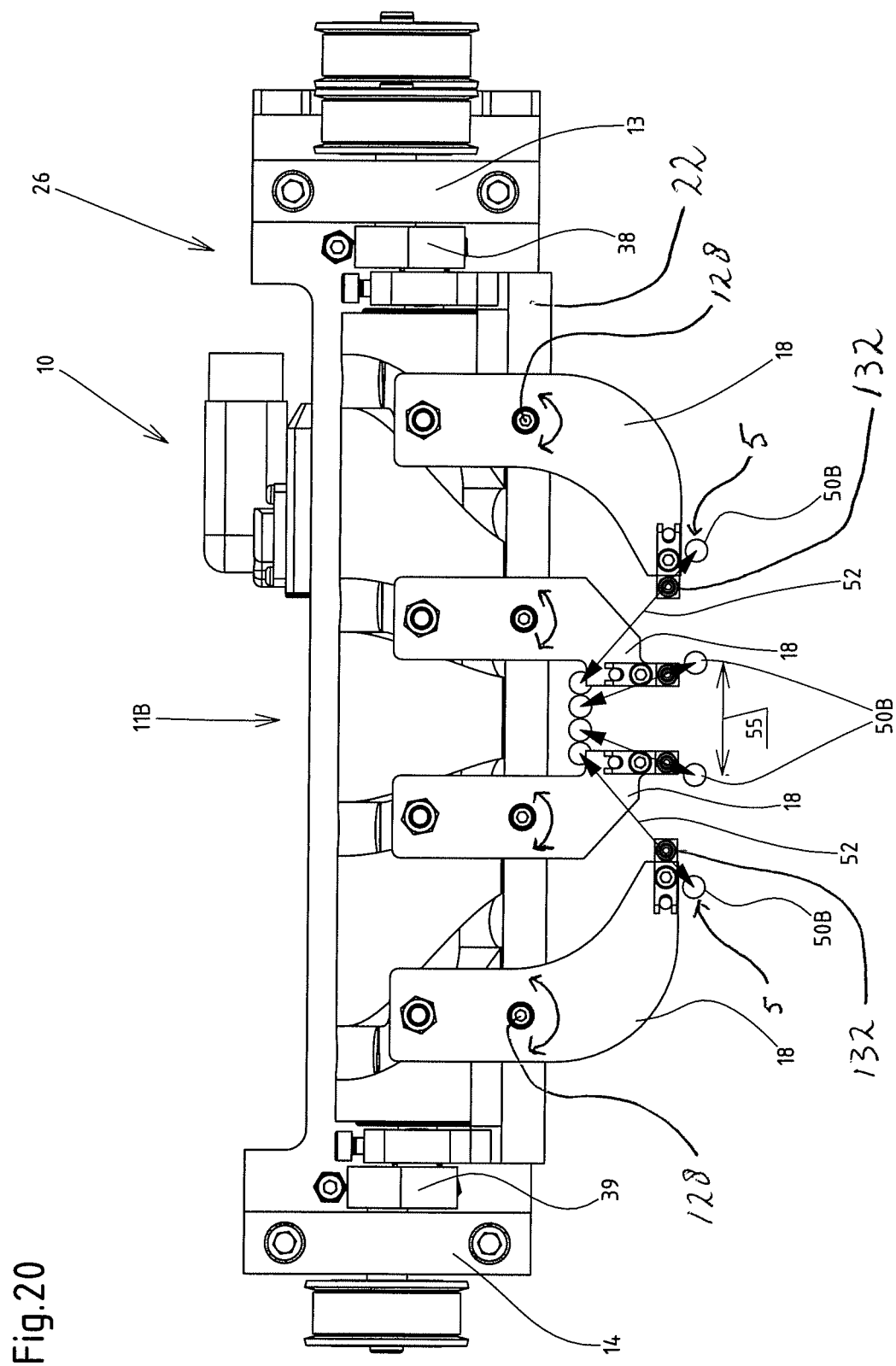
FIG. 20 shows a top view of a fourth embodiment of the invention.

Turning to FIG. 20, a fourth embodiment is disclosed. The fourth embodiment has arms 18 that are connected to the support unit base 22 via pivotable couplings 128. The arms 18 pivot clockwise or counter-clockwise about the pivotable couplings 128, depending on the rotational direction of the cam track body 24. The pivoting movement of the arms 18 results in a horizontal displacement of the pickup members 132, and thereby in a horizontal displacement of the objects 5.

It will be recognized that an embodiment may not achieve all of the stated objects.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A pick-and-place device constructed for picking up and placing multiple objects simultaneously, the pick-and-place device comprising:
    a base frame comprising a left post and a right post;
    a coupling device comprising a left eccentric member and a right eccentric member, wherein the left and right eccentric members are pivotable relative to the left and right posts about an eccentric member axis;
    a support unit which is pivotably connected to the left and right post via the left eccentric member and the right eccentric member, wherein the support unit supports a multiple movable arms, wherein the support unit is movable relative to the base frame, wherein the support unit comprises:
        a support unit base; and
        at least one cam track body which is connected to the support unit base, wherein multiple cam tracks are defined in the at least one cam track body, wherein the at least one cam track body is fixed to said left and right eccentric member, wherein the at least one cam track body is rotatable relative to the support unit base, wherein the at least one cam track body is pivotable about the eccentric member axis, and wherein a cam track axis is offset over a distance from the eccentric member axis;
    wherein the coupling device couples the rotation of the at least one cam track body relative to the support unit base to the movement of the support unit relative to the base frame; and
    wherein the multiple movable arms are connected to and supported by the support unit, wherein each movable arm comprises:
        a cam configured to move in a rotatable cam track which is associated with said movable arm; and
        a pickup member connected to a free end of each arm, the pickup member being configured to pick up an object and to move said object from a first location to a second location, wherein each moveable arm including the pickup member is movable between a first arm position and a second arm position, and wherein the movements of the respective pickup members are composed of:
            the movement of the support unit relative to the base frame; and
            the movement of the respective arms relative to the support unit.

2. The pick-and-place device according to claim 1, wherein the pickup members are movable from respective first positions to respective second positions over respective curved paths, wherein said curved paths are movements composed of two separate movements:
    a circular or composite movement of the support unit relative to the base frame; and
    a rotary or linear movement of the arms relative to the support unit.

3. The pick-and-place device according to claim 1, wherein:

the support unit comprises a traveller track mounted to the support unit base; and each movable arm comprises a traveller configured for travelling along said traveller track between a first traveller position and a second traveller position, wherein each arm is supported by the support unit via the traveller.

4. The pick-and-place device according to claim 3, wherein the support unit trajectory is aligned with a first plane, and wherein the movement of the arms relative to the support unit are aligned with a second plane which moves with the support unit and which is orthogonal to the first plane; and wherein the traveller track is straight and defines a linear movement of the arms between the respective first traveller positions and the second traveller positions, wherein said traveller track is oriented at a right angle to said first plane, wherein the direction of movement of the arms is also oriented at a right angle to the first plane.

5. The pick-and-place device according to claim 3, wherein the eccentric member axis and the cam track axis are parallel to the traveller track.

6. The pick-and-place device according to claim 3, wherein the cam tracks are diverging, and wherein during the movement of the arms from the respective first traveller positions to the second traveller positions the arms move away from one another, increasing a distance between the pickup members.

7. The pick-and-place device according to claim 3, wherein each movable arm is configured to move in a direction parallel to the traveller track.

8. The pick-and-place device according to claim 1, wherein the posts define:

the eccentric member axis; and a second eccentric member axis which is parallel to the eccentric member axis, wherein the coupling device further comprises a second right eccentric member which is positioned at a distance from the right eccentric member and a second left eccentric member which is positioned at a distance from the left eccentric member, wherein the second right eccentric member and the second left eccentric member are pivotable relative to the right and left post about the second eccentric member axis, wherein the support unit is pivotably connected to the left post via both the second left eccentric member and the left eccentric member and to the right post via both the second right eccentric member and the right eccentric member, and wherein the four eccentric members define the trajectory of the support unit relative to the base frame and the rotation of the at least one cam track body relative to the support unit.

9. The pick-and-place device according to claim 8, wherein the coupling device comprises a rotation coupling member which couples the second left eccentric member to the left eccentric member and/or couples the second right eccentric member to the right eccentric member in order to keep the second left and right eccentric members in a same rotational position as the left and right eccentric members during the movement of the support unit along the support unit trajectory.

10. The pick-and-place device according to claim 8, wherein:

the support unit comprises a traveller track mounted to the support unit base, each movable arm comprises a traveller configured for travelling along said traveller track between a first traveller position and a second traveller position, wherein each arm is supported by the support unit via the traveller, and wherein the traveller track, the cam track axis, the eccentric member axis and the second eccentric member axis extend horizontally.

11. The pick-and-place device according to claim 8, wherein the eccentric member axis is vertically below the second eccentric member axis.

12. The pick-and-place device according to claim 8, wherein the second eccentric member axis is horizontally offset over a distance from the eccentric member axis.

13. The pick-and-place device according to claim 1, wherein the support unit trajectory is aligned with a first plane, and wherein the movement of the arms relative to the support unit are aligned with a second plane which moves with the support unit and which is orthogonal to the first plane.

14. The pick-and-place device according to claim 1, wherein the at least one cam track body is located in a lower region of the support unit, and wherein the movable arms are located above the at least one cam track body.

15. The pick-and-place device according to claim 1, wherein said at least one cam track body is a cylinder, the cam tracks being grooves in said cylinder.

16. The pick-and-place device according to claim 1, comprising a suction device, the suction device comprising a suction pump and conduits extending from the suction pump to suction nozzles of the pickup members and a control system for controlling the suction at the suction nozzles.

17. The pick-and-place device according to claim 1, wherein the cam track body is rotatably connected to the left and right post and has only a single degree of freedom of movement relative to the left and right post, the single degree of freedom being the rotation about the eccentric member axis.

18. The pick-and-place device according to claim 1, further comprising a right linear bearing connected to the right post and free to rotate, and a left linear bearing connected to the left post and free to rotate, wherein the coupling device comprises a right rod and a left rod extending from the support unit and being connected in a sliding manner to respectively the left linear bearing and the right linear bearing.

19. The pick-and-place device according to claim 1, wherein each arm is connected to the support unit base via a pivotable coupling.

20. A method of picking and placing, the method comprising:

picking a plurality of objects at respective first object positions with a pick-and-place device according to claim 1;

moving the support unit from a first support position to a second support position, wherein during said movement the at least one rotatable cam track body rotates relative to the support unit, and wherein each moveable arm moves from the first arm position to the second arm position as a result of the interaction between the cam and the cam track; and placing the objects at respective second object positions.

* * * * *